US012655350B2

(12) United States Patent
Bremer et al.

(10) Patent No.: US 12,655,350 B2
(45) **Date of Patent: *Jun. 16, 2026**

(54) LIQUID CRYSTALLINE MEDIUM AND ELECTRO-OPTICAL DEVICE

(71) Applicant: MERCK PATENT GMBH, Darmstadt (DE)

(72) Inventors: Matthias Bremer, Darmstadt (DE); Atsutaka Manabe, Darmstadt (DE); Martin Kraska, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,918

(22) Filed: Dec. 27, 2024

(65) Prior Publication Data

US 2025/0230359 A1 Jul. 17, 2025

Related U.S. Application Data

(62) Division of application No. 18/039,870, filed as application No. PCT/EP2021/083540 on Nov. 30, 2021, now Pat. No. 12,215,267.

(30) Foreign Application Priority Data

| | | |
|---|---|---|
| Dec. 2, 2020 | (EP) | 20211314 |
| May 12, 2021 | (EP) | 21173651 |
| Aug. 3, 2021 | (EP) | 21189410 |

(51) Int. Cl.

| | |
|---|---|
| ***G02F 1/1333*** | (2006.01) |
| ***C09K 19/02*** | (2006.01) |
| ***C09K 19/20*** | (2006.01) |
| ***C09K 19/30*** | (2006.01) |
| ***C09K 19/34*** | (2006.01) |

(Continued)

(52) U.S. Cl.

CPC ...... *C09K 19/2007* (2013.01); *C09K 19/0225* (2013.01); *C09K 19/3098* (2013.01); *C09K 19/3402* (2013.01); *C09K 19/3458* (2013.01); *C09K 2019/0466* (2013.01); *C09K 2019/123* (2013.01); *C09K 2019/2035* (2013.01);

(Continued)

(58) Field of Classification Search

CPC .......................... C09K 19/20; C09K 19/2007; C09K 19/3003; C09K 19/3402; C09K 19/0225; C09K 19/3098; C09K 19/3458; C09K 2019/0466; C09K 2019/123; C09K 2019/2035; C09K 2019/2042; C09K 2019/3422; C09K 2019/0444; C09K 2019/3004; G02F 1/1333

See application file for complete search history.

(56) References Cited

U.S. PATENT DOCUMENTS

| | | |
|---|---|---|
| 5,148,074 A | 9/1992 | Fujita et al. |
| 5,454,975 A | 10/1995 | Reiffenrath et al. |

(Continued)

FOREIGN PATENT DOCUMENTS

| | | |
|---|---|---|
| CN | 105121596 A | 12/2015 |
| DE | 19629551 A1 | 1/1997 |

(Continued)

OTHER PUBLICATIONS

International search report PCT/EP2021/083540 dated Mar. 29, 2022 (pp. 1-5).

(Continued)

*Primary Examiner* — Geraldina Visconti

(74) *Attorney, Agent, or Firm* — Csaba Henter; MILLEN, WHITE, ZELANO & BRANIGAN

(57) ABSTRACT

The new media exhibit a ferroelectric nematic phase preferably at ambient temperature. They preferably comprise one or more compounds selected from the group of compounds of formulae IA, IB and IC,

IA

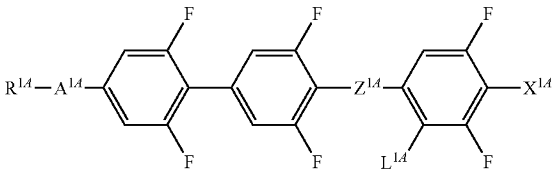

IB

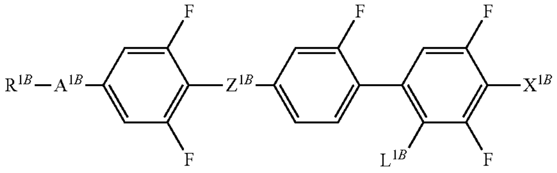

IC

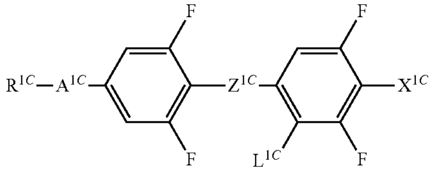

in which the variable groups have the meanings indicated in the text and in the claims. Use of the media for providing ferroelectric nematic materials and a method of operation of an electro-optical device are presented. The media may be useful for energy-saving displays and electrical appliances.

18 Claims, 1 Drawing Sheet

(51) Int. Cl.
*C09K 19/04* (2006.01)
*C09K 19/12* (2006.01)

(52) U.S. Cl.
CPC ................ *C09K 2019/2042* (2013.01); *C09K 2019/3422* (2013.01)

(56) References Cited

U.S. PATENT DOCUMENTS

| | | | | |
|---|---|---|---|---|
| 5,820,782 | A | 10/1998 | Yamada et al. | |
| 7,419,706 | B2 | 9/2008 | Heckmeier et al. | |
| 9,120,969 | B2 | 9/2015 | Wittek et al. | |
| 9,822,305 | B2 | 11/2017 | Wittek et al. | |
| 9,938,462 | B2 | 4/2018 | Manabe et al. | |
| 9,938,464 | B2 | 4/2018 | Wittek et al. | |
| 11,261,163 | B2 | 3/2022 | Bremer et al. | |
| 12,215,267 | B2 * | 2/2025 | Bremer | C09K 19/0225 |
| 12,312,529 | B2 * | 5/2025 | Bremer | C07C 255/55 |
| 2013/0057947 | A1 | 3/2013 | Wittek et al. | |
| 2016/0115388 | A1 | 4/2016 | Wittek et al. | |
| 2020/0292334 | A1 | 9/2020 | Kaneichi et al. | |
| 2021/0163820 | A1 | 6/2021 | Junge et al. | |
| 2024/0002727 | A1 * | 1/2024 | Bremer | C09K 19/3098 |
| 2024/0004374 | A1 | 1/2024 | Yang et al. | |
| 2025/0230359 | A1 * | 7/2025 | Bremer | C09K 19/3402 |

FOREIGN PATENT DOCUMENTS

| | | | | |
|---|---|---|---|---|
| EP | 2708587 | A1 | 3/2014 | |
| JP | H0264616 | A | 3/1990 | |
| JP | 2009249618 | A | 10/2009 | |
| JP | 2020149124 | A | 9/2020 | |
| KR | 20000059378 | A | 10/2000 | |
| WO | 2014053204 | A1 | 4/2014 | |
| WO | 2017020989 | A1 | 2/2017 | |
| WO | 2019110458 | A1 | 6/2019 | |
| WO | WO-2019121368 | A1 * | 6/2019 | C09K 19/02 |
| WO | 2022117551 | A1 | 6/2022 | |

OTHER PUBLICATIONS

N. Sebastián et al., "Ferroelectric-Ferroelastic Phase Transition in a Nematic Liquid Crystal"; Physical Review Letters, 2020, 124, 037801-1-037801-6.

Atsutaka Manabe: "Ferroelectric phase at and below room temperature", Liquid Crystals, vol. 48, 2021, pp. 1079-1086.

Li et al, "Development of ferroelectric nematic fluids with giant-□ dielectricity and nonlinear optical properties" Sci. Adv. 2021; 7 : eabf5047 Apr. 21, 2021 (pp. 1-9).

Hiroya Nishikawai, "A Fluid Liquid-Crystal Material with Highly Polar Order" Adv. Mater., vol. 29, 2017, pp. 1702354.

O. D. Lavrentovich, "Ferroelectric nematic liquid crystal, a century in waiting"; PNAS (Jun. 23, 2020), 117 (25), pp. 14021-14031; www.pnas.org/cgi/doi/10.1073/pnas.2008947117.

* cited by examiner

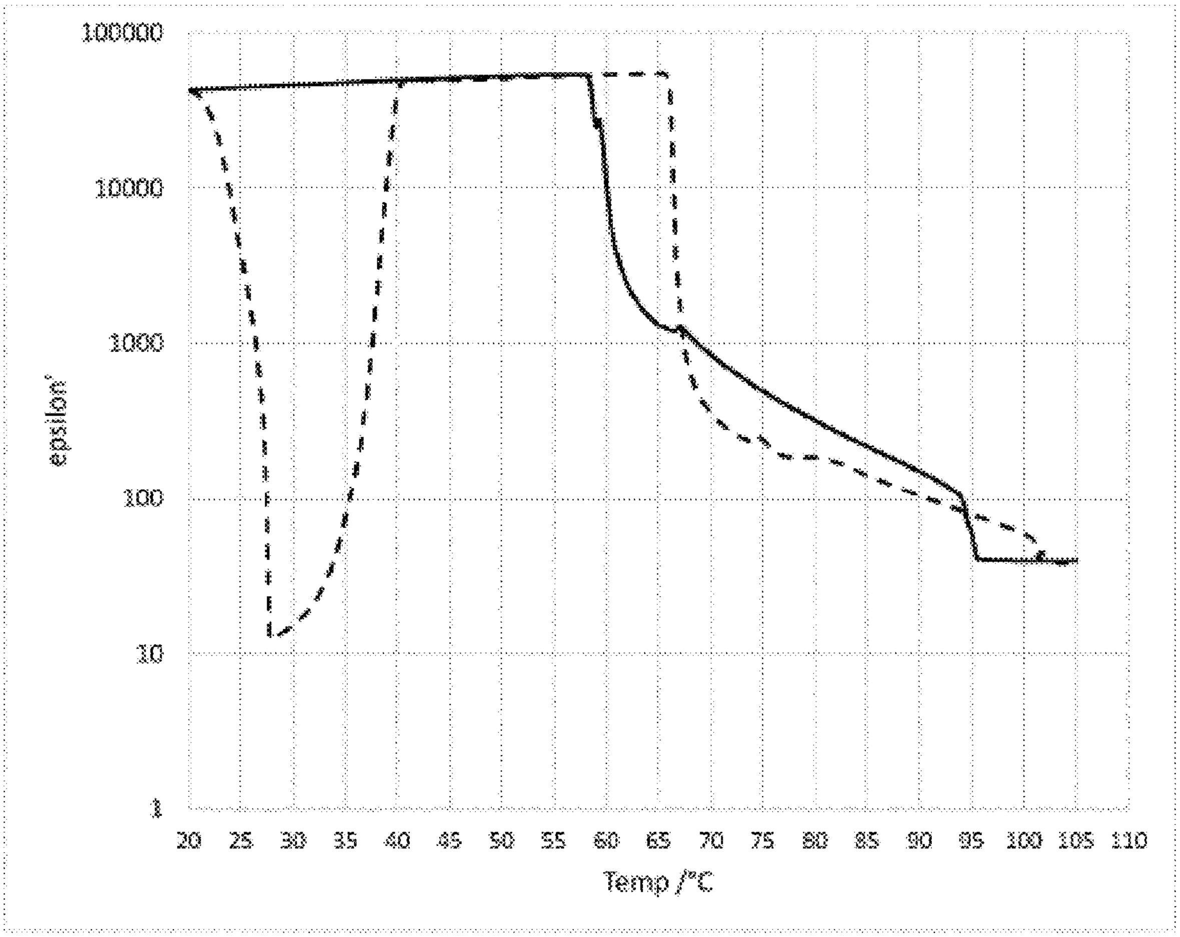
100000
10000
1000
100
10
1
epsilon'
20 25 30 35 40 45 50 55 60 65 70 75 80 85 90 95 100 105 110
Temp /°C

LIQUID CRYSTALLINE MEDIUM AND ELECTRO-OPTICAL DEVICE

An aspect of the invention relates to liquid crystalline media exhibiting a ferroelectric nematic liquid crystalline phase over a substantial range of temperatures, preferably at ambient temperature. Preferably these media comprise one or more compounds selected from the group of compounds of the formulae IA, IB and IC as defined below, which sustain a ferroelectric nematic liquid crystalline phase. In addition, the present invention relates to liquid crystal displays and electro-optical elements which contain the liquid crystalline media according to the invention, as well as to a method for the operation of an electro-optical device.

In previous years, the areas of application for liquid crystal compounds have been considerably expanded to various types of display devices, electro-optical devices, electronic components, sensors, etc. For this reason, a number of different structures have been proposed, in particular in the area of nematic liquid crystals. The nematic liquid-crystal mixtures have to date found the broadest use in flat-panel display devices. They have been employed, in particular, in passive TN or STN matrix displays or systems having a TFT active matrix, including the well-known TN, IPS, FFS and VA systems.

Most of these devices employ the nematic liquid crystal phase, including all common LCD television sets, LCD desktop monitors and mobile LCD devices. Some alternative liquid crystalline phases are known, like ferroelectric smectic phases or blue phases. However, a ferroelectric nematic phase ($N_f$-LC phase) had been postulated only by theory for decades, without finding a suitable liquid crystalline material with such property. Recently, two chemical structures have been reported to show signs of ferroelectric nematic behaviour.

Hiroya Nishikawa, Kazuya Shiroshita, Hiroki Higuchi, Yasushi Okumura, Yasuhiro Haseba, Shin-ichi Yamamoto, Koki Sago, and Hirotsugu Kikuchi, *Adv. Mater.* 2017, 29, 1702354, describe a compound of formula A to have a ferroelectric nematic behaviour at temperatures between about 45° C. to 68° C.

A

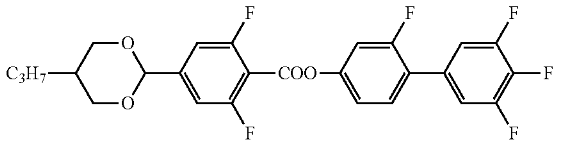

Further, Nerea Sebastián, Luka Cmok, Richard J. Mandle, María Rosario de la Fuente, Irena Drevenšek Olenik, Martin Čopič and Alenka Mertelj, Physical Review Letters (2020) 124, 037801 describe a compound of formula B with similar behaviour between about 120° C. to 133° C.

B

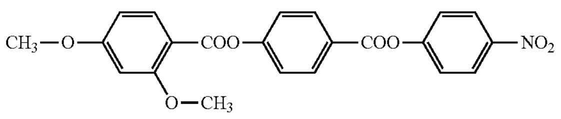

Further comparison of the two only available substances for $N_f$-LC phases is presented by Xi Chen et al., PNAS Jun. 23, 2020 117 (25) 14021-14031. The high significance of the advent of the new $N_f$-LC phase underlines O. D. Lavrentovic, Proc Nat Acad Sci USA (2020), 117(26), 14629-14631. However, the observed temperatures for the Ni phase are well above ambient temperatures.

So far no liquid crystalline compound was described having a ferroelectric nematic liquid crystalline phase ($N_f$-LC phase) close to ambient temperature. Ambient temperature, also sometimes called room temperature, is intended to mean a temperature of 20° C. here.

Exploitation of the $N_f$-LC phase for technical applications would clearly benefit from applicability to ambient temperatures. Display applications are usually designed to have a working range above and below ambient temperature, respectively room temperature, e. g. from 15° C. to 25° C., preferably from 0° to 50° C. and preferably more.

A ferroelectric nematic display is proposed in DE 19629551 A1, however it does not disclose any specific materials at all, that can fulfil the requested ferroelectric nematic properties.

The use of fluorinated liquid crystal substances is known to the person skilled in the art. Various compounds containing two 2,6-difluorinated 1,4-phenylene rings have already been described as liquid-crystalline or mesogenic material, such as, for example, in the publications WO 2015/101405 A1 and WO 2005/019381 A1 and various more. The compounds proposed therein are well characterized but not reported to have any ferroelectric properties.

An object of the present invention was finding novel stable compounds and materials which are suitable as ferroelectric nematic liquid crystal media ($N_f$-LC phase media). In particular, the compounds should simultaneously have a $N_f$-LC phase or support such phase in a $N_f$-LC medium. They should also have a moderate to high optical anisotropy for achieving the electrooptical switching effect as with conventional nematic LC media.

In view of the very wide variety of areas of application of compounds of this type having high dielectric anisotropy ($\Delta\varepsilon$), it was desirable to have available further compounds, preferably having a high clearing point and low melting point, while showing a broad and suitable temperature range of the ferroelectric nematic phase.

It was thus a further object of the invention to find novel stable compounds which are suitable as component(s) of ferroelectric nematic liquid crystal media, in particular for displays analogous to conventional nematic TN, STN, IPS, FFS and TN-TFT displays.

In addition, it was an aim for the compounds according to the invention to be thermally and photochemically stable under the conditions prevailing in the areas of application. As mesogens, they should facilitate a broad mesogenic phase, preferably a nematic phase in mixtures with liquid crystal co-components and be readily miscible with mesogenic, preferably nematic, base mixtures, in particular at low temperatures, at least below room temperature.

Surprisingly, it has been found that the disclosed compounds are eminently suitable as components of $N_f$-LC media. They can be used to obtain liquid crystal media which require particularly high or even extremely high dielectric anisotropies, in particular for displays, mainly IPS or FFS displays, but also for TN or STN displays. The compounds used according to the invention are sufficiently stable and colourless. In particular, they are distinguished by extraordinarily high dielectric constants and by very high dielectric anisotropies ($\Delta\varepsilon$). Owing to high dielectric anisotropies e. g. much lower threshold voltages are necessary on use in optical switching elements. They have reasonably good solubility for compounds having comparable properties and can be admixed with similar compounds almost unlimited. In addition, the compounds used according to the present invention have a high clearing point. These compounds also have relatively low melting points, or can be stably kept below their melting point as super-cooled melts, which facilitates the formation of the desired $N_f$-LC phase at even lower temperatures, e. g. at room temperature and below.

The provision of the compounds and mixtures according to the invention very generally considerably broadens the range of liquid crystal substances that are suitable, from various applicational points of view, for the preparation of ferroelectric nematic liquid crystal mixtures.

The compounds used according to the invention have a broad range of applications. Depending on the choice of substituents, these compounds can serve as base materials of which liquid crystal media are predominantly composed. However, it is also possible to add liquid-crystalline base materials from other classes of compounds to the presented compounds in order, for example, to further lower the melting points, to influence the dielectric and/or optical anisotropy of a dielectric of this type and/or to optimise its threshold voltage and/or its viscosity.

The use of the $N_f$-LC phase enables LC media having extremely short response times compared with conventional nematic LC systems as currently used in standard displays. The invention may as such improve substantially the means for displaying moving images. The high dielectric constant is also interesting for dielectrics in capacitors. The media may be useful for energy-saving displays and other electrical appliances by making use of the outstanding dielectrical properties. Low voltage is needed in comparison with prior art.

The liquid crystal compounds can be used as component (s) of liquid crystal media, in particular for displays based on the principle of the twisted cell, the guest-host effect, the effect of deformation of aligned phases DAP or ECB (electrically controlled birefringence), the IPS (in-plane switching) effect or the effect of dynamic scattering.

BRIEF DESCRIPTION OF THE DRAWINGS

FIG. 1 shows a graph representing the dielectric properties of Mixture Example 5 over a range of temperature of 20 to 105° C. The $T/\varepsilon_r$ graph measured at 10 Hz and a voltage of about 50 mV shows the values of the relative dielectric permittivity $\varepsilon_r$ upon cooling down (continuous line) and heating op (dashed line) at different temperatures T. At about 20 to 60° C. the value of $\varepsilon_r$ has a maximum (plateau shape) with a sharp decline towards higher temperatures. The maximum permittivity value of $\varepsilon_r$ is about $4 \cdot 10^3$.

The invention in one main aspect relates to liquid crystalline media comprising one, two, three or more compounds selected from the group of compounds of formulae IA, IB and IC,

IA

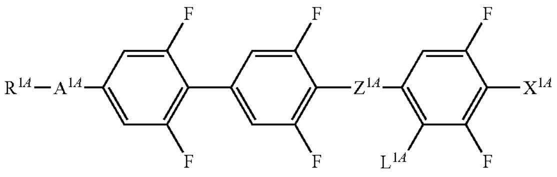

-continued

IB

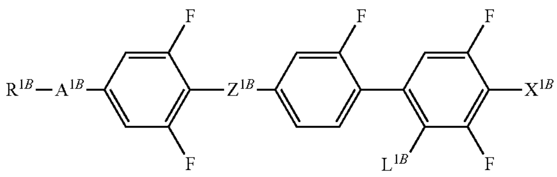

IC

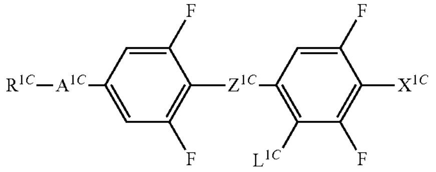

in which $X^{1A}$, $X^{1B}$ and $X^{1C}$ independently of each other denote CN, F, $CF_3$, $-OCF_3$, SCN, NCS, $SF_5$ or $O-CF=CF_2$, preferably $-CN$, F, $-CF_3$, $-OCF_3$, $-Cl$ or $-NCS$, most preferably F or CN, $Z^{1A}$, $Z^{1B}$ and $Z^{1C}$ independently of one another denote $-(C=O)-O-$ or $-CF_2-O-$, $A^{1A}$ denotes

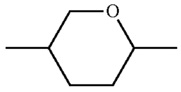, 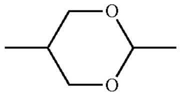,

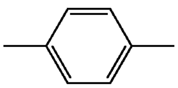 or 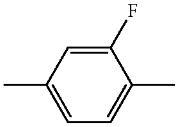, preferably

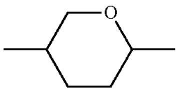, 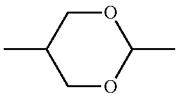 or

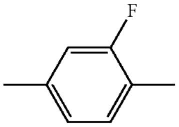, most preferably

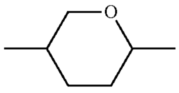 or 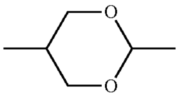, $A^{1B}$ denotes

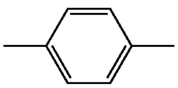 or 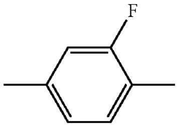, preferably

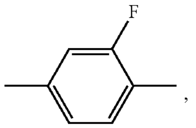, $A^{1C}$ denotes

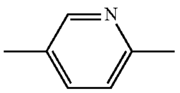, 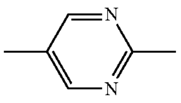,

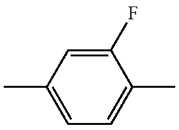 or 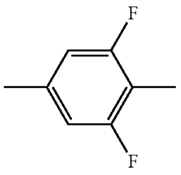, preferably

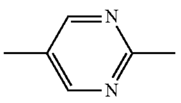, 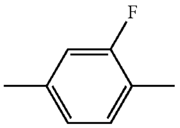 or

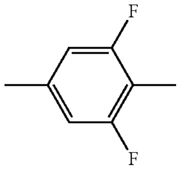, most preferably

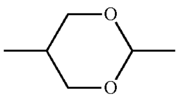 or 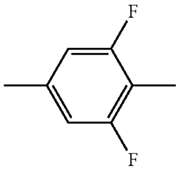, $L^{1A}$, $L^{1B}$ and $L^{1C}$ independently of each other denote H or $CH_3$, preferably H, $R^{1A}$, $R^{1B}$ and $R^{1C}$ independently of each another denote an alkyl radical having 1 to 15 C atoms, preferably 1 to 7, more preferably 1 to 6 and most preferably 1 to 5 C atoms, where, in addition, one or more $CH_2$ groups in these radicals may in each case be replaced, independently of one another, by —C≡C—, —$CF_2O$—, —$OCF_2$—, —CH═CH—,

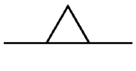, 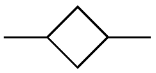, 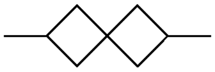,

-continued

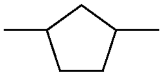, 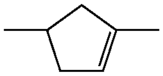,

—O—, —S—, —CO—O— or —O—CO— in such a way that O/S atoms are not linked directly to one another, and in which, in addition, one or more H atoms may be replaced by halogen, or denotes H, preferably $R^{1A}$, $R^{1B}$ and $R^{1C}$ each are a halogenated or unsubstituted alkyl radical having 1 to 15 C atoms, where, in addition, one or more $CH_2$ groups in these radicals may in each case be replaced, independently of one another, by —C≡C— or —CH═CH—.

The invention further relates to the use of the compounds of the formulae IA, IB and IC in liquid crystalline media, preferably in ferroelectric nematic media.

The present invention likewise relates to liquid crystal media which comprise at least one compound of the formula I (IA, IB, IC) and optionally any additives.

One further aspect of the current invention is use of the liquid crystalline medium for providing a ferroelectric nematic liquid crystal material.

In the pure state, the compounds of the formulae IA, IB and IC are colourless and, per se or in mixtures, form liquid-crystalline mesophases in a temperature range which is favourably located for electro-optical use. The compounds according to the invention enable broad ferroelectric nematic phase ranges to be achieved. They also support nematic phase ranges outside the range of the $N_f$-phases. In liquid crystalline mixtures, the compounds of formulae IA, IB and IC used according to the invention significantly increase the optical anisotropy. At the same time, these compounds are distinguished by sufficiently good UV stability.

The radicals $R^{1A}$, $R^{1B}$ and $R^{1C}$ in the respective formulae IA, IB and IC and their respective sub-formulae preferably denote alkyl having 1 to 8 carbon atoms, alkoxy having 1 to 8 carbon atoms or alkenyl having 2 to 8 carbon atoms. These alkyl chains are preferably linear or they, preferably in case of $R^{1C}$, are branched by a single methyl or ethyl substituent, preferably in 2- or 3-position. $R^{1A}$, $R^{1B}$ and $R^{1C}$ particularly preferably denote a straight-chain alkyl radical having 1 to 7 C atoms or an unbranched alkenyl radical having 2 to 8 C atoms, in particular unbranched alkyl having 1 to 5 C atoms.

Alternative preferred radicals $R^{1A}$, $R^{1B}$ and $R^{1C}$ are selected from cyclopentyl, 2-fluoroethyl, cyclopropylmethyl, cyclopentylmethyl, cyclopentylmethoxy, cyclobutylmethyl, 2-methylcyclopropyl, 2-methylcyclobutyl, 2-methylbutyl, 2-ethylpentyl and 2-alkyloxyethoxy.

Alternatively the radicals $R^{1A}$, $R^{1B}$ and $R^{1C}$ denote H or alkyl having 1 to 5 C atoms.

The radical $X^{1A}$, $X^{1B}$ and $X^{1C}$ respectively of the formulae IA, IB and IC preferably denote CN, F or $CF_3$, preferably denote CN or F and, most preferably, in particular for $X^{1C}$, CN.

Compounds of the formula IA, IB and IC containing branched or substituted end groups $R^{1A}$, $R^{1B}$ and $R^{1C}$, respectively, may occasionally be of importance owing to better solubility in the conventional liquid-crystalline base materials. The groups $R^{1A}$, $R^{1B}$ and $R^{1C}$, respectively, are preferably straight chain, not branched chain.

The radicals $R^{1A}$, $R^{1B}$ and $R^{1C}$, respectively, particularly preferably selected from the moieties:

H $CH_3$ $C_2H_5$ $n-C_3H_7$
$n-C_4H_9$
$n-C_5H_{11}$
$C_2H_5CH(CH_3)CH_2$
$n-C_6H_{13}$
$n-C_7H_{15}$
$n-C_3H_7CH(C_2H_5)CH_2$
$n-C_8H_{17}$
$c-C_3H_5$
$c-C_3H_5CH_2$
$c-C_4H_7$
$c-C_5H_7$
$c-C_5H_9$
$c-C_5H_9CH_2$
$CH_2{=}CH$
$CH_3CH{=}CH$
$CH_2{=}CH(CH_2)_2$
$CH_3O$
$C_2H_5O$
$n-C_3H_7O$
$n-C_4H_9O$
and
$n-C_5H_{11}O$ wherein the following abbreviations for the end groups are used:

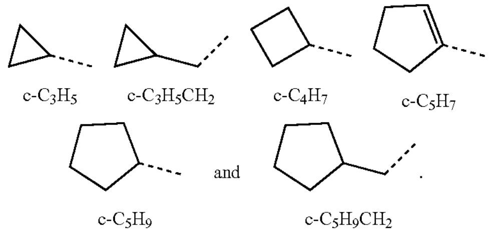

$c-C_3H_5$, $c-C_3H_5CH_2$, $c-C_4H_7$, $c-C_5H_7$, $c-C_5H_9$ and $c-C_5H_9CH_2$.

In a preferred embodiment, the media according to the present invention preferably comprise one, two, three or more compounds of formula IA,

IA

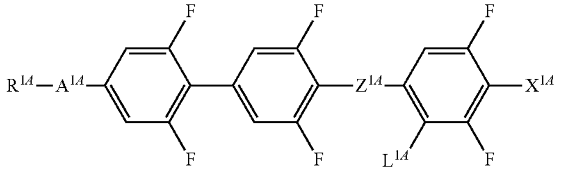

preferably selected from the group of formulas IA-1 to IA-3, preferably of formula IA-1- or IA-2, most preferably of formula IA-2:

IA-1

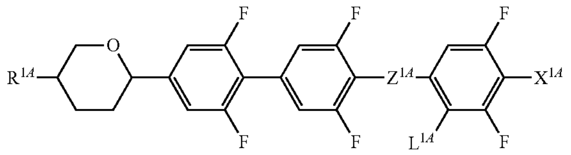

-continued

IA-2

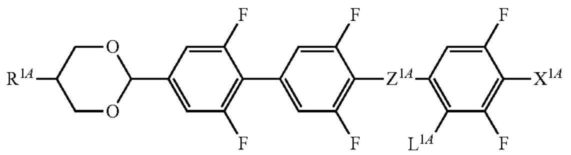

IA-3

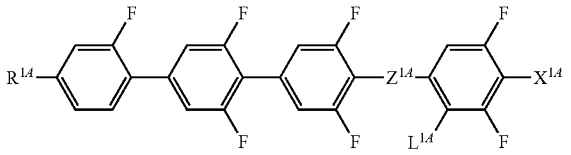

in which the parameters have the respective meanings given above and preferably $Z^{1A}$ denotes —$CF_2$—O—, and $X^{1A}$ denotes —CN or F, preferably —CN, and, in particular in formula IA-2, preferably alternatively $X^{1A}$ denotes F.

The mixture preferably comprises 40% by weight or more, more preferably 45% or more, more preferably 50% or more of the compounds of formula IA.

In a preferred embodiment, the media according to the present invention preferably comprise one, two, three or more compounds of formula IB,

IB

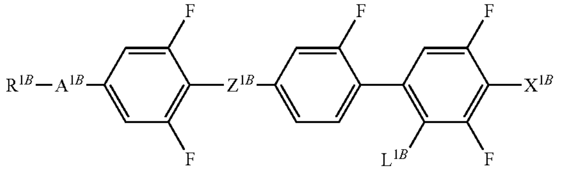

preferably selected from the group of formulae IB-1 and IB-2, preferably of formula IB-2:

IB-1

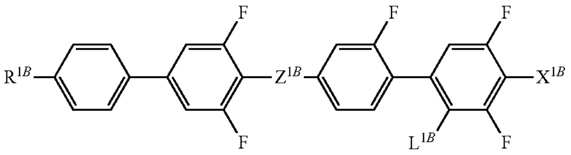

IB-2

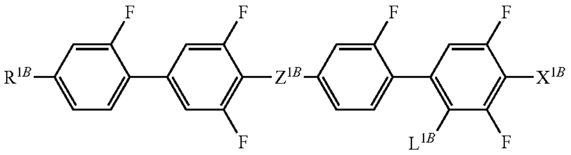

in which the parameters have the respective meanings given above and preferably $Z^{1B}$ denotes —$CF_2$—O—, and $X^{1B}$ denotes —CN, and, in particular in formula IB-2, preferably alternatively $Z^{1B}$ denotes —(C═O)—O—, and $X^{1A}$ denotes F.

In a preferred embodiment, the media according to the present invention preferably comprise one, two, three or more compounds of formula IC,

IC

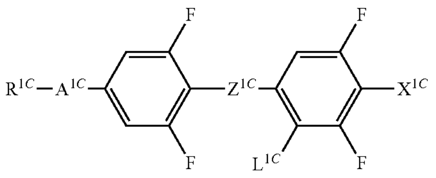

preferably selected from the group of formulae IC-1 to IC-4, more preferably selected from the group of formulae IC-2 and IC-3 and most preferably of formula IC-3:

IC-1

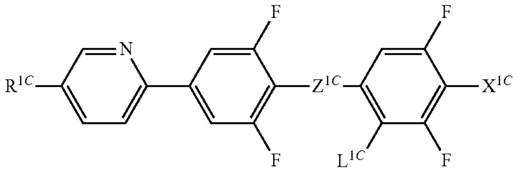

IC-2

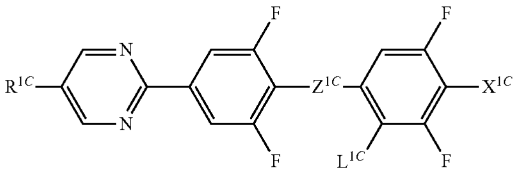

IC-3

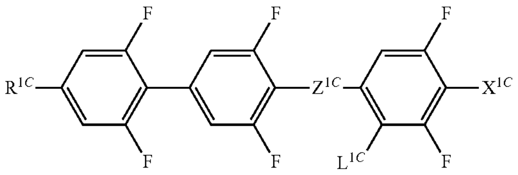

IC-4

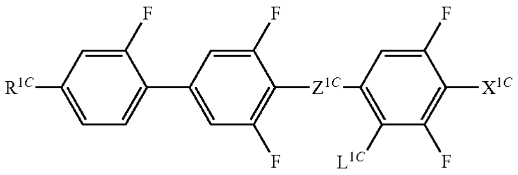

in which the parameters have the respective meanings given above and preferably $Z^{1C}$ denotes (C═O)—O—, and $X^{1C}$ denotes —CN, and, in particular in formula IC-2, preferably alternatively $Z^{1C}$ denotes —$CF_2O$— and $X^{1C}$ denotes F.

Particularly preferred compounds of the formula IC used in the media are the compounds of the formulae IC-3.1 to IC-3.20

IC-3.1

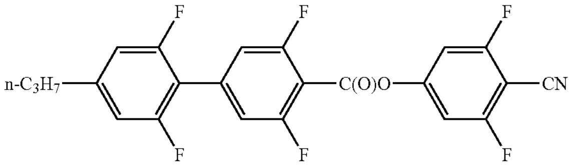

IC-3.2

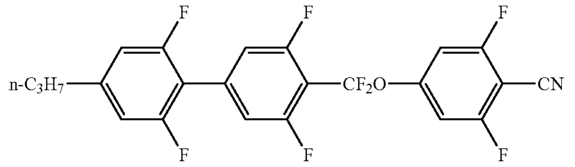

IC-3.3

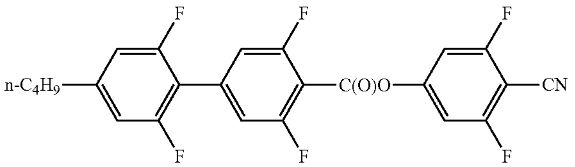

IC-3.4

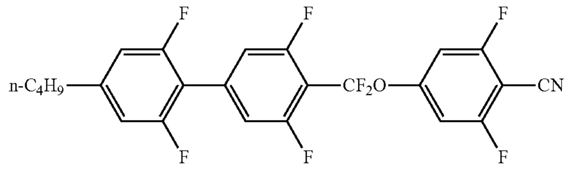

IC-3.5

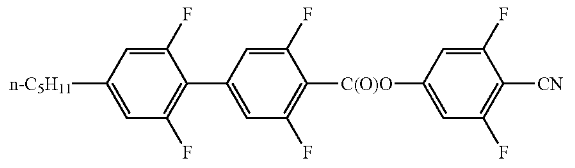

IC-3.6

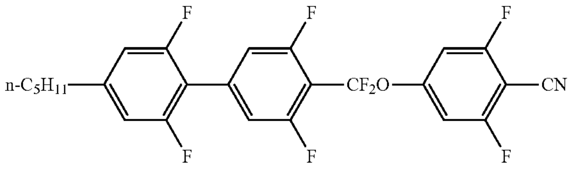

IC-3.7

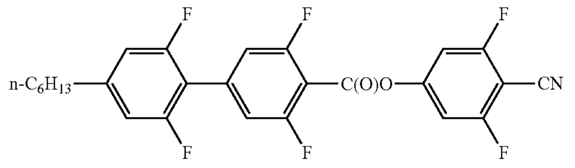

IC-3.8

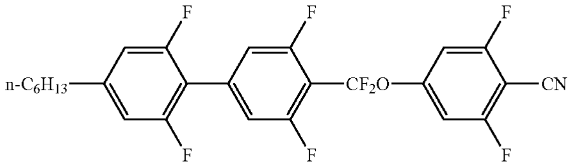

-continued
IC-3.9
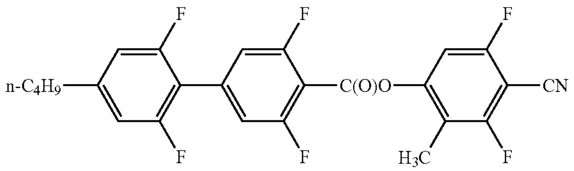
IC-3.10
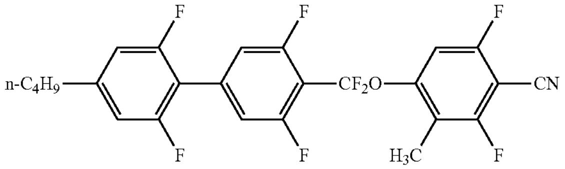
IC-3.11
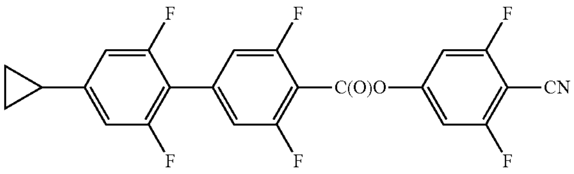
IC-3.12
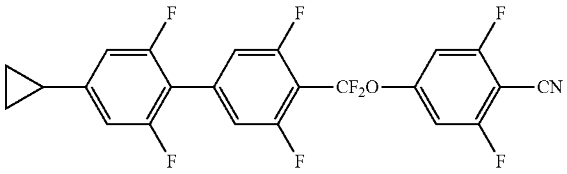
IC-3.13
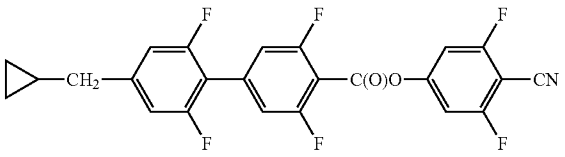
IC-3.14
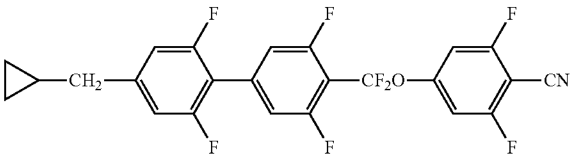
IC-3.15
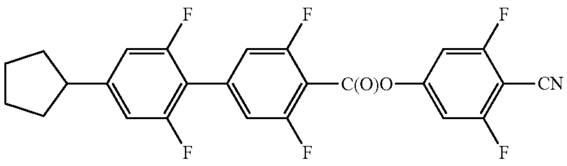
IC-3.16
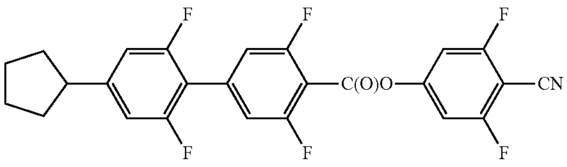
-continued
IC-3.17
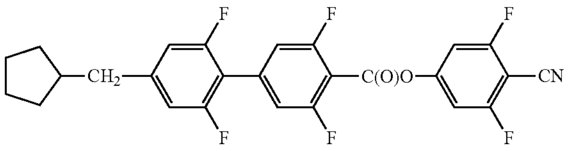
IC-3.18
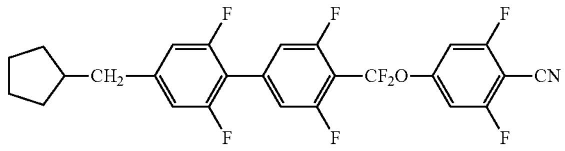
IC-3.19
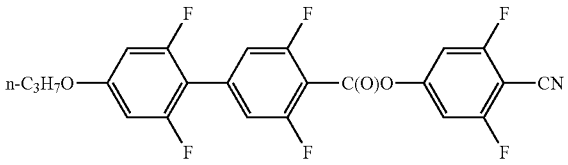
IC-3.20
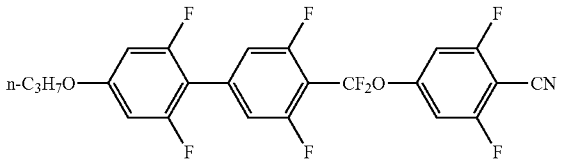
and further the compounds of the formulae IC-3.21 to IC-3.26:
IC-3.21
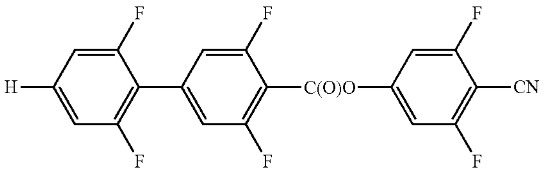
IC-3.22
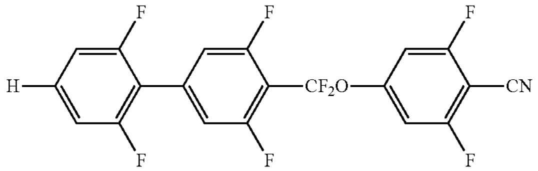
IC-3.23
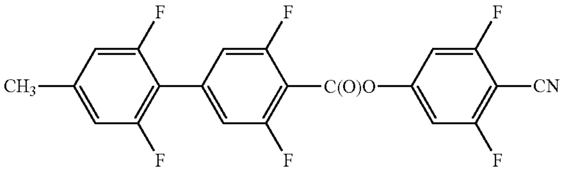

-continued

IC-3.24

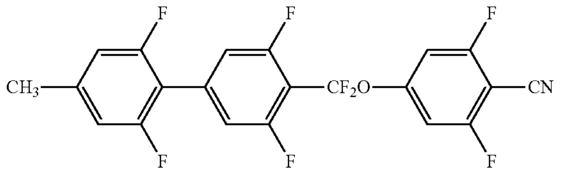

IC-3.25

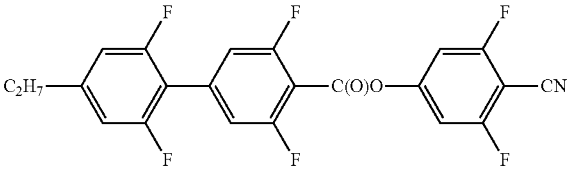

IC-3.26

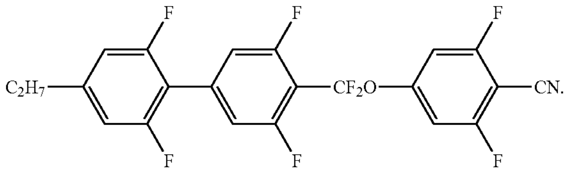

Particularly preferred compounds of formula IC used in the media are those of the following formulae:

IC-3.1

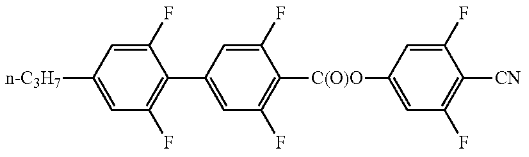

and

IC-3.2

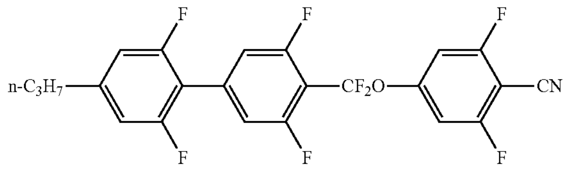

In a preferred embodiment of the present invention the media comprise 15% by weight or more of one or more compounds of formula IA-3-N,

IA-3-N

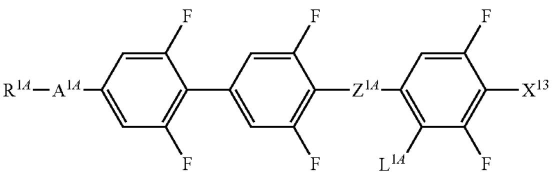

and, optionally, preferably 5%, more preferably 15% by weight or more of one or more of compounds of formula IA-3-F,

IA-3-F

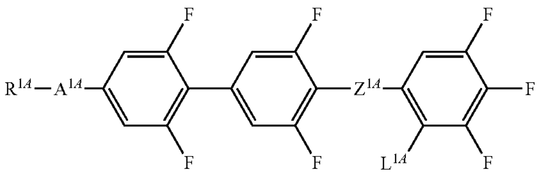

and, optionally, preferably 15%, more preferably 20% by weight or more of one or more compounds selected from formula IC

IC

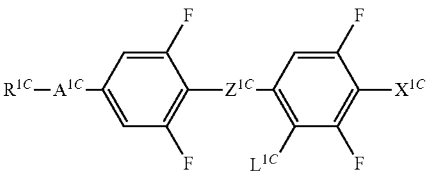

in which $X^{13}$ denotes —CN or —NCS, preferably —CN, $X^{1C}$ denotes —CN, F, $CF_3$, —$OCF_3$, —NCS, $SF_5$ or O—CF═$CF_2$, preferably —CN or F, most preferably CN, $Z^{1A}$ denotes —(CO)—O— or —$CF_2$—O—, $Z^{1C}$ is —(CO)—O— or —$CF_2$—O—, $L^{1A}$ and $L^{1C}$ independently of each other denote H or $CH_3$, preferably H, $A^{1A}$ denotes

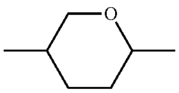,
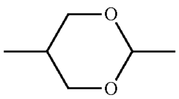,
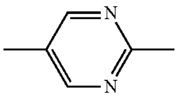,
or
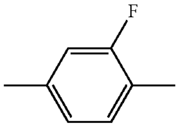

preferably

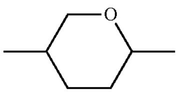,
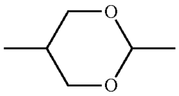
or
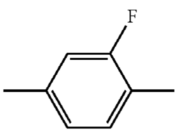, most preferably

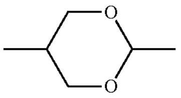 or 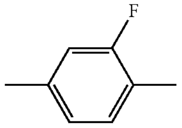 , $A^{1C}$ independently denotes

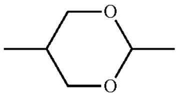 , 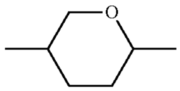 ,

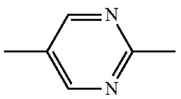 , 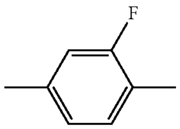 or

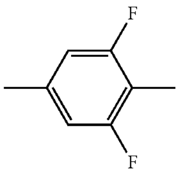 , preferably

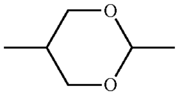 , 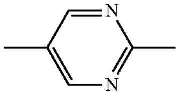 ,

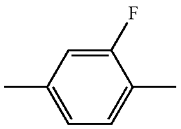 or 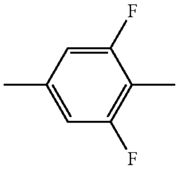 , most preferably

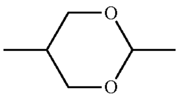 , 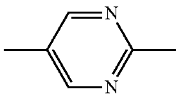 or

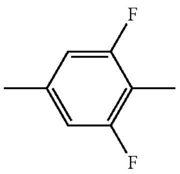 , $R^{1A}$ and $R^{1C}$ independently of each another denote an alkyl radical having 1 to 12 C atoms, preferably 1 to 8, more preferably 1 to 6 and most preferably 1 to 5 C atoms, where, in addition, one or more $CH_2$ groups in these radicals may in each case be replaced, independently of one another, by —C≡C—, —$CF_2$—O—, —$OCF_2$—, —CH=CH—,

 , 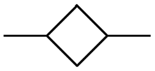 , 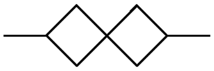 ,

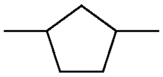 , 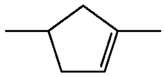 ,

—O—, —S—, —(CO)—O— or —O—(CO)— in such a way that O/S atoms are not linked directly to one another, and in which, in addition, one or more H atoms may be replaced by halogen, or denotes H, preferably $R^{1A}$, $R^{1B}$ and $R^{1C}$ independently are a halogenated or unsubstituted alkyl radical having 1 to 10 C atoms, where, in addition, one or more $CH_2$ groups in these radicals may be replaced by —O— or —CH=CH— in such a way that O atoms are not linked directly.

In a preferred embodiment of the present invention the media comprise up to 100% of one or more compounds, preferably of two, three or more, compounds selected from group 1 of compounds, the group of compounds of formulae IA, IB and IC. In this embodiment the media preferably predominantly consist of, more preferably they essentially consist of, and most preferably, they virtually completely consist of these compounds. In this embodiment the concentration of the compounds of this group 1 of compounds preferably is in the range from 50% or more, preferably 60 or more, to 100% or less.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

Preferably the media according to the present application fulfil one or more of the following conditions. They preferably comprise one, two, three or more compounds of the formula IA, one, two, three or more compounds of the formula IA, wherein $X^{1A}$ is F, one, two, three or more compounds of the formula IA, wherein $X^{1A}$ is CN, preferably at least 15% by weight, more preferably at least 25% by weight, and most preferably at least 30% by weight, one, two, three or more compounds of the formula IB, one, two, three or more compounds of the formula IC, one, two, three or more compounds of the formula IC, wherein $X^{1C}$ is CN, preferably at least 35% or more, more preferably 45%, 55% or 65% by weight or more.

one, two, three or more compounds of the formula IA wherein $X^{1A}$ denotes CN combined with one, two, three or more compounds of the formula IA wherein $X^{1A}$ denotes F, one, two, three or more compounds of the formula IA-1, preferably of formula AUUQU-n-N, most preferably selected from the group of the compounds AUUQU-2-N, AUUQU-3-N, AUUQU-4-N and AUUQU-5-N, and/or one, two, three or more compounds of the formula IA-2, preferably of formulae DUUQU-n-N and/or DUUQU-n-F, most preferably selected from the group of the compounds DUUQU-2-N, DUUQU-3-N, DUUQU-4-N, DUUQU-5-N, DUUQU-6-N, DUUQU-7-N, DUUQU-2-F, DUUQU-4-F, DUUQU-5-F and DUUQU-6-F, and/or one, two, three or more compounds of the formula IA-3, preferably of formula GUUQU-n-N, more preferably of formula GUUQU-0-N, GUUQU-1-N, GUUQU-2-N, GUUQU-3-N, GUUQU-4-N or GUUQU-5-N, mostly preferred the compound GUUQU-3-N, and/or one, two, three or more compounds of the formula IA-3 of formula GUUQU-n-F, most the compounds GUUQU-2-N, GUUQU-3-N, GUUQU-4-N or GUUQU-5-N, and/or one, two, three or more compounds of the formula IB-2, preferably of formula GUQGU-n-N, more preferably the compound GUQGU-3-N, and/or one, two, three or more compounds of the formula IC-2, preferably of formula MUZU-n-F, most the compounds MUZU-4-F and/or MUZU-5-F, and/or one, two, three or more compounds of the formula IC-3, preferably of formulae UUZU-n-N and/or UUQU-n-N, most preferably selected from the group of the compounds UUZU-4-N, UUZU-5-N and UUQU-4-N, and further from UUZU-0-N, UUZU-1-N, UUZU-2-N, UUZU-3-N, UUQU-0-N, UUQU-1-N, UUQU-2-N, UUQU-3-N and UUQU-5-N.

In a preferred embodiment of the present invention said compounds of formulae IA, IB and IC are a first group of compounds, group 1, of compounds.

In one embodiment of the invention the media optionally, preferably obligatorily, comprise one or more compounds selected from the following groups of compounds:

Optionally, preferably obligatorily, either alternatively or additionally to further compounds besides those of formulae IA, IB and IC, i.e. of the group 1 of compounds, one or more compounds, preferably two, three or more compounds, selected from the group 2, the group of compounds of formulae II and III, preferably in a concentration from more than 0% to 50% or less,

II

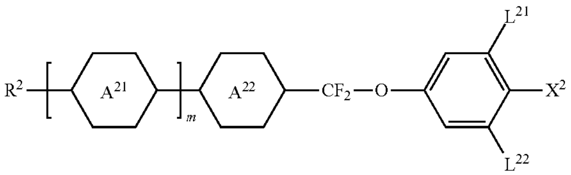

III

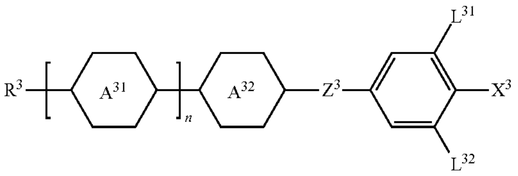

wherein $R^2$ denotes an alkyl radical having 1 to 15 C atoms, preferably 1 to 7, more preferably 1 to 6 and most preferably 1 to 5 C atoms, where, in addition, one or more $CH_2$ groups in these radicals may in each case be replaced, independently of one another, by —C≡C—, —$CF_2$O—, —O$CF_2$—, —CH═CH—,

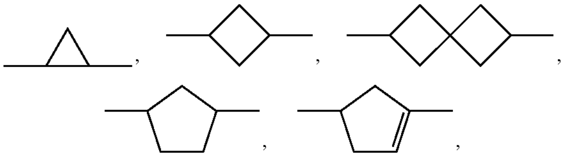

—O—, —S—, —CO—O— or —O—CO— in such a way that O/S atoms are not linked directly to one another, and in which, in addition, one or more H atoms may be replaced by halogen, or denotes H, preferably denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

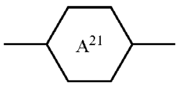

and

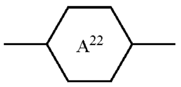

on each appearance, independently of one another, denote

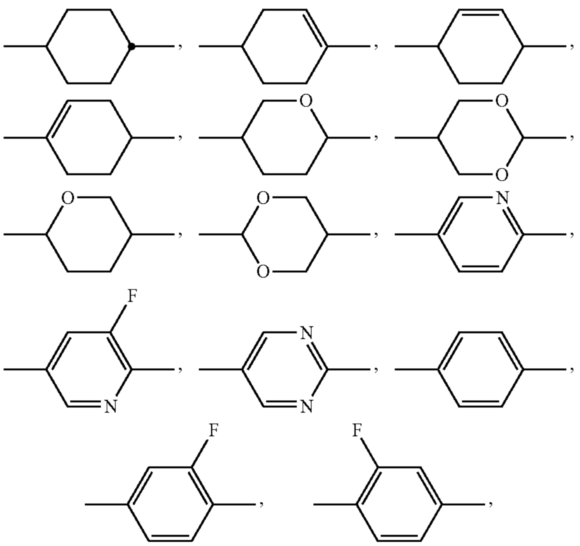

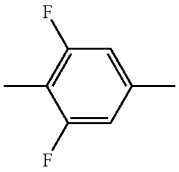

or

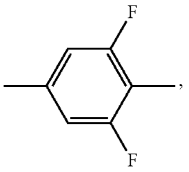

preferably

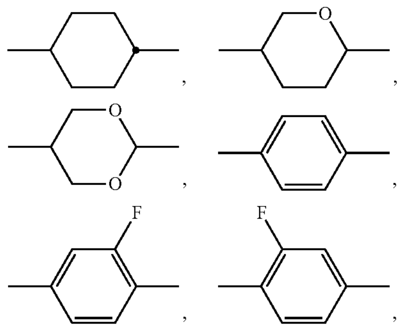

or

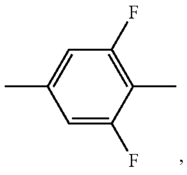

$L^{21}$ and $L^{22}$ denote H or F, preferably $L^{21}$ denotes F, $X^2$ denotes halogen, halogenated alkyl or alkoxy having 1 to 3 C atoms or halogenated alkenyl or alkenyloxy having 2 or 3 C atoms, preferably F, Cl, $—OCF_3$, $—O—CH_2CF_3$, $—O—CH{=}CH_2$, $—O—CH{=}CF_2$ or $—CF_3$, very preferably F, Cl, $—O—CH{=}CF_2$ or $—OCF_3$, m denotes 0, 1, 2 or 3, preferably 1 or 2 and particularly preferably 2, $R^3$ denotes an alkyl radical having 1 to 15 C atoms, preferably 1 to 7, more preferably 1 to 6 and most preferably 1 to 5 C atoms, where, in addition, one or more $CH_2$ groups in these radicals may in each case be replaced, independently of one another, by —C≡C—, $—CF_2O—$, $—OCF_2—$, —CH=CH—,

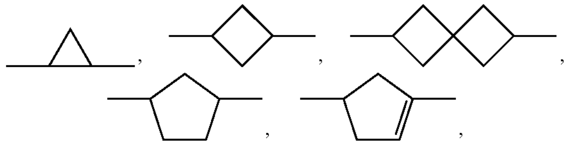

—O—, —S—, —CO—O— or —O—CO— in such a way that O/S atoms are not linked directly to one another, and in which, in addition, one or more H atoms may be replaced by halogen, or denotes H, preferably denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably n-alkyl, cyclopropyl, cyclopentyl or alkenyl,

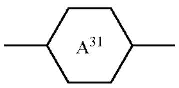

and

on each appearance, independently of one another, are

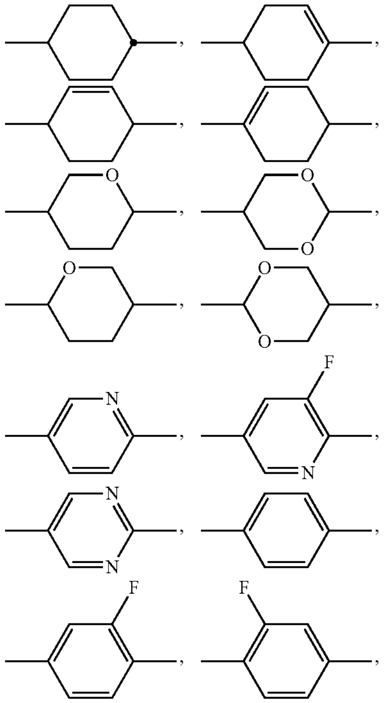

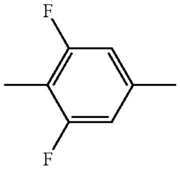

or

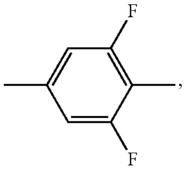

preferably

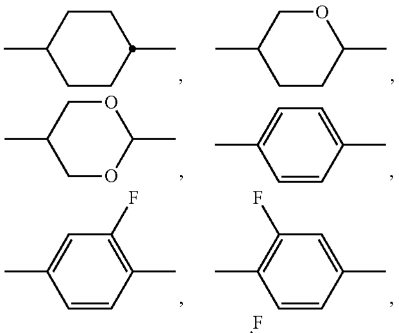

or

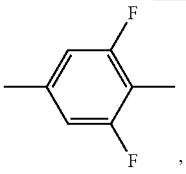

$L^{31}$ and $L^{32}$, independently of one another, denote H or F, preferably $L^{31}$ denotes F, $X^3$ denotes halogen, halogenated alkyl or alkoxy having 1 to 3 C atoms or halogenated alkenyl or alkenyloxy having 2 or 3 C atoms, F, Cl, $—OCF_3$, $—OCHF_2$, $—O—CH_2CF_3$, $—O—CH{=}CF_2$, $—O—CH{=}CH_2$ or $—CF_3$, very preferably F, Cl, $—O—CH{=}CF_2$, $—OCHF_2$ or $—OCF_3$, $Z^3$ denotes —$CH_2CH_2$—, —$CF_2CF_2$—, —(CO)O-trans-CH═CH—, trans-CF═CF—, —$CH_2O$— or a single bond, preferably —$CH_2CH_2$—, —(CO)O-trans-CH═CH— or a single bond and very preferably —(CO)—O-trans-CH═CH— or a single bond, and n denotes 0, 1, 2 or 3, preferably 1, 2 or 3 and particularly preferably 1, wherein the respective rings, and preferably the phenylene rings, optionally may each be substituted by one or two alkyl groups, preferably by methyl and/or ethyl groups, preferably by one methyl group, and, wherein especially the ring

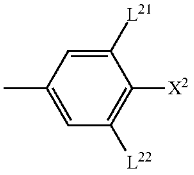

may be replaced by

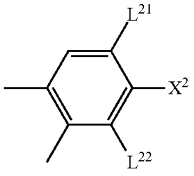

and especially the ring

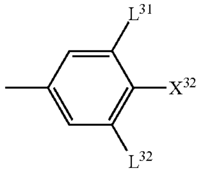

may be replaced by

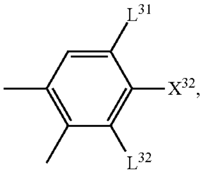

and wherein compounds of formulae IA, IB and IC are excluded from the compounds of formula II, again optionally, preferably obligatorily, either alternatively or additionally, one or more compounds, preferably two, three or more compounds, selected from the group 3 the group of compounds of formulae IV and V, preferably in a concentration from more than 0% to 20%, preferably no more than 10%,

IV

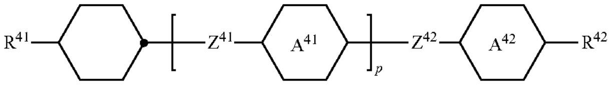

V

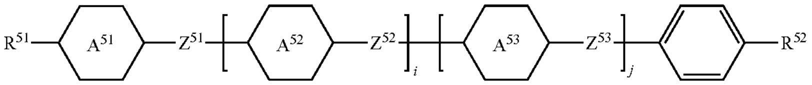

wherein $R^{41}$ and $R^{42}$, independently of one another, denote an alkyl radical having 1 to 15 C atoms, preferably 1 to 7, more preferably 1 to 6 and most preferably 1 to 5 C atoms, where, in addition, one or more $CH_2$ groups in these radicals may in each case be replaced, independently of one another, by —C≡C—, —$CF_2O$—, —$OCF_2$—, —CH═CH—,

, 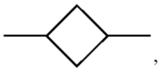, 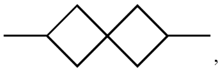,

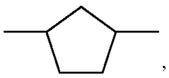, 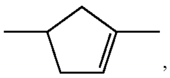,

—O—, —S—, —CO—O— or —O—CO— in such a way that O/S atoms are not linked directly to one another, and in which, in addition, one or more H atoms may be replaced by halogen, or denotes H, preferably have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

 and 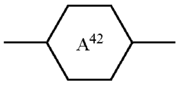

independently of one another and, if

occurs twice, also these independently of one another, denote

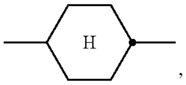 , 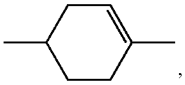 , 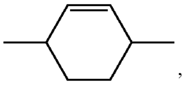 ,
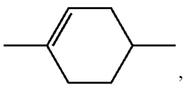 , 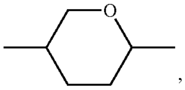 , 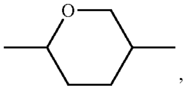 ,
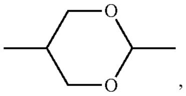 , 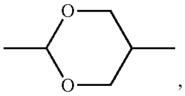 , 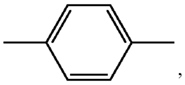 ,
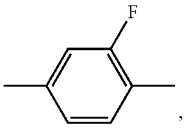 , 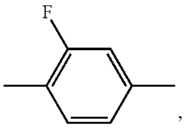 , 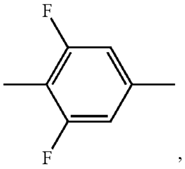 ,
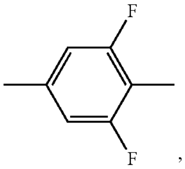 , 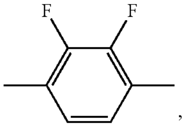 ,
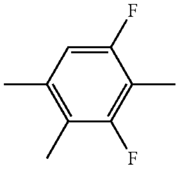 or 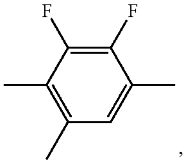 , preferably one or more of

 and 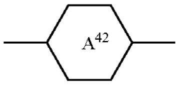

denotes or denote,

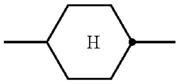

$Z^{41}$ and $Z^{42}$, independently of one another and, if $Z^{41}$ occurs twice, also these independently of one another, denote $-CH_2CH_2-$, $-(CO)O-$, trans-$CH{=}CH-$, trans-$CF{=}CF-$, $-CH_2O-$, $-CF_2O-$, $-C{\equiv}C-$ or a single bond, preferably one or more thereof denotes/denote a single bond, and p denotes 0, 1 or 2, preferably 0 or 1, and $R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

 to  , if present, each, independently of one another, denote

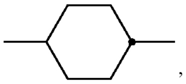 , 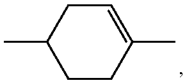 , 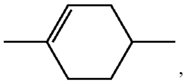 ,
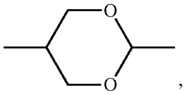 , 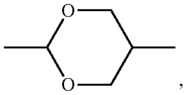 , 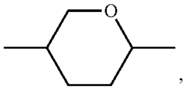 ,
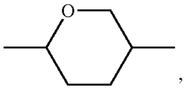 , 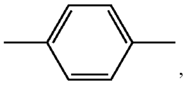 , 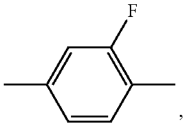 ,
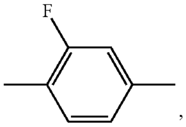 , 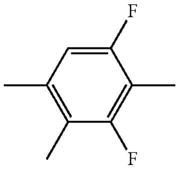 or
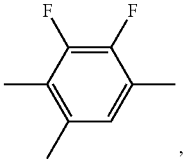 , preferably

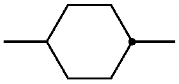 , 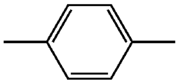 ,
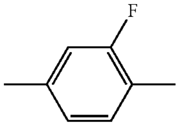 , or 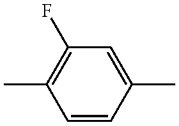 , preferably

denotes

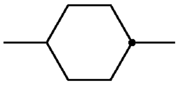 , and, if present,

preferably denotes

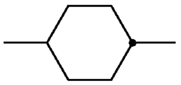, $Z^{51}$ to $Z^{53}$ each, independently of one another, denote $-CH_2-CH_2-$, $-CH_2-O-$, $-CH{=}CH-$, $-C{\equiv}C-$, $-(CO)O-$ or a single bond, preferably $-CH_2-CH_2-$, $-CH_2-O-$ or a single bond and particularly preferably a single bond, i and j each, independently of one another, denote 0 or 1, (i+j) preferably denotes 0, 1 or 2, more preferably 0 or 1 and, most preferably, 1, wherein the respective rings, and preferably the phenylene rings, optionally may each be substituted by one or two alkyl groups, preferably by methyl and/or ethyl groups, preferably by one methyl group, and again optionally, preferably obligatorily, either alternatively or additionally, one or more compounds, preferably two, three or more compounds, selected from the group 4 the group of compounds of formulae I and VI to IX, preferably in a concentration from more than 0% to 20%,

VI

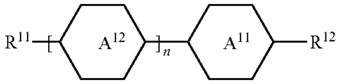

VII

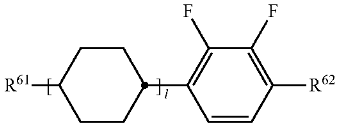

VIII

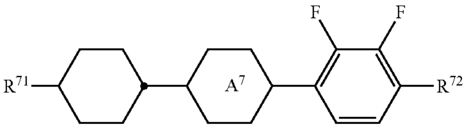

XI

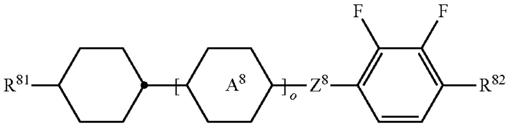

X

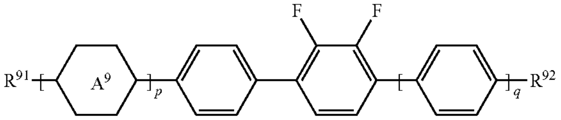

wherein

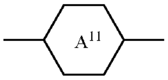

denotes

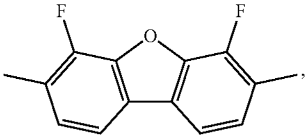,

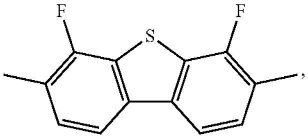,

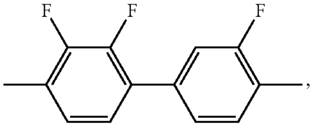,

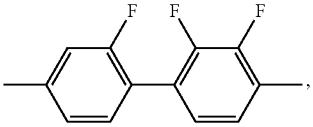,

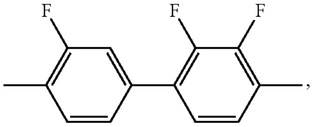,

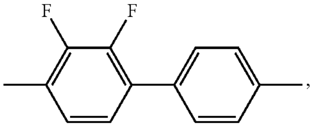,

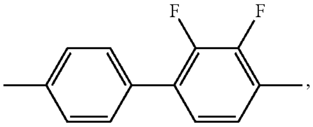,

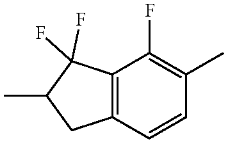 or 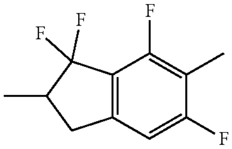

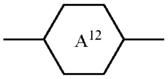

denotes

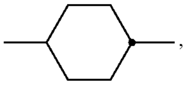, 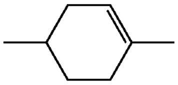,

-continued

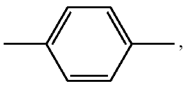, 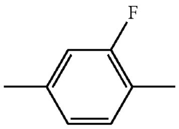 or

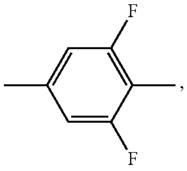, preferably

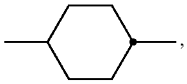, 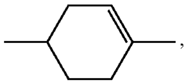,

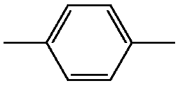 or 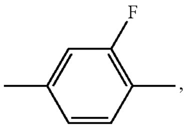, n denotes 0 or 1, $R^{11}$ and $R^{12}$ independently of each other denote alkyl, alkoxy, fluorinated alkyl or fluorinated alkoxy, preferably having 1 to 7 C atoms, wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl, alkoxy, alkenyl or alkenyloxy, most preferably alkyl, alkoxy or alkenyloxy, $R^{61}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms, an unsubstituted alkoxy radical having 1 to 6 C atoms or an unsubstituted alkenyloxy radical having 2 to 6 C atoms, $R^{62}$ denotes an unsubstituted alkyl radical having 1 to 7 C atoms, an unsubstituted alkoxy radical having 1 to 6 C atoms or an unsubstituted alkenyloxy radical having 2 to 6 C atoms, and l denotes 0 or 1, $R^{71}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{72}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms, and

denotes

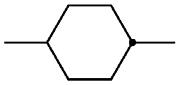, 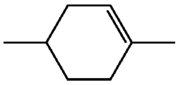 or

, $R^{81}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{82}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms,

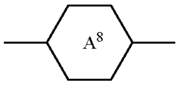

denotes

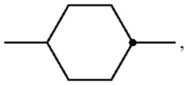, 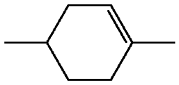 or

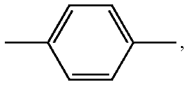, preferably

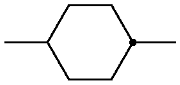 or 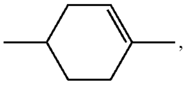, more preferably

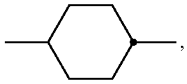, $Z^8$ denotes —(C═O)—O—, —$CH_2$—O—, —$CF_2$—O— or —$CH_2$—$CH_2$—, preferably —(C═O)—O— or —$CH_2$—O—, and o denotes 0 or 1, $R^{91}$ and $R^{92}$ independently of one another have the meaning given for $R^{72}$ above, $R^{91}$ preferably denotes an alkyl radical having 2 to 5 C atoms, preferably having 3 to 5 C atoms, $R^{92}$ preferably denotes an alkyl or alkoxy radical having 2 to 5 C atoms, more preferably an alkoxy radical having 2 to 4 C atoms, or an alkenyloxy radical having 2 to 4 C atoms.

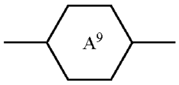

denotes

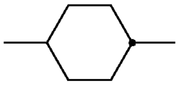 or 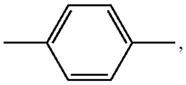, p and q independently of each other denote 0 or 1, and (p+q) preferably denotes 0 or 1, in case

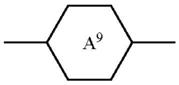

denotes

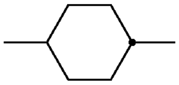 or 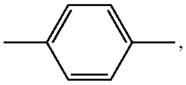, alternatively, preferably p=q=1, wherein the respective rings, and preferably the phenylene rings, optionally may each be substituted by one or two alkyl groups, preferably by methyl and/or ethyl groups, preferably by one methyl group, and wherein especially the rings

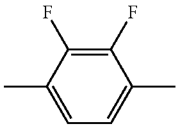

alternatively be replaced by

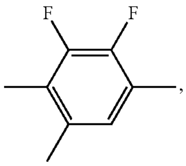, and wherein the compounds of formula VIII are excluded from the compounds of formula X, and the compounds of formula VI are excluded from the compounds of formulae VII to X again optionally, preferably obligatorily, either alternatively or additionally, one or more compounds, preferably two, three or more compounds, selected from the group 5, the group of compounds of formula B, preferably in a concentration from more than 0% to 20%,

B

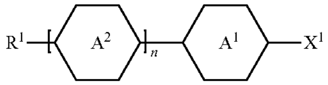

wherein

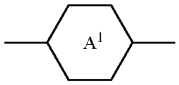

denotes

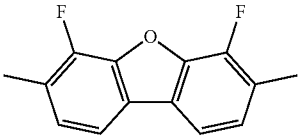 or

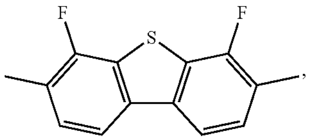, 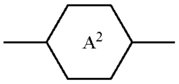

denotes, in each occurrence independently of one another,

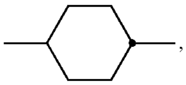, 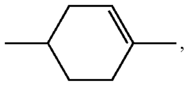, 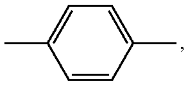,

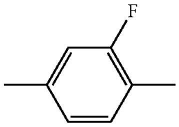 or 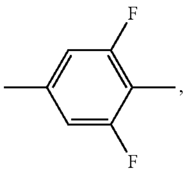, preferably

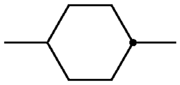 or 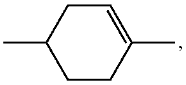, most preferably

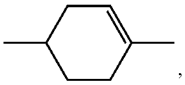, n denotes 0, 1 or 2, preferably 1, $R^1$ denotes an alkyl, radical having 1 to 7 C atoms, wherein one or more $CH_2$ groups, preferably one $CH_2$ group, in this radical may each be replaced, independently of one another, by —C≡C—, —$CF_2O$—, —$OCF_2$—, —O—, —(CO)—O—, —O—(C=O)—, cyclo-propylene, 1,3-cyclobutylene, 1,3-cyclopentylene, 1,3-cyclo-pentenylene, preferably by cyclopropylene or 1,3-cyclopentylene, preferably one $CH_2$ group may be replaced by a 1,2-cyclopropylene group, by a 1,3-cyclopentylene group or by a 1,3-cyclopentenylene group, alkenyl, alkenyloxy, alkoxyalkyl or fluorinated alkenyl having 2 to 7 C atoms and preferably alkyl or alkenyl, wherein one —$CH_2$— group may be replaced by cyclo-propylene, 1,3-cyclobutylene, 1,3-cyclopentylene, 1,3-cyclo-pentenylene, preferably by cyclopropylene or 1,3-cyclopentenylene, in such a way that O atoms are not linked directly to one another, and in which one or more H atoms may be replaced by halogen, and $X^1$ denotes F, Cl, fluorinated alkyl, fluorinated alkenyl, fluorinated alkoxy or fluorinated, the latter four groups preferably having 1 to 4 C atoms, more preferably F, Cl, $CF_3$ or $OCF_3$, and wherein the respective rings, and preferably the phenylene rings, optionally may each be substituted by one or two alkyl groups, preferably by methyl and/or ethyl groups, preferably by one methyl group.

Preferred are media comprising one or more compounds of groups 1 and 2, of groups 1 and 3 or of groups 1 and 4, more preferred of groups 1 and 2 or of groups 1 and 3.

Also particularly preferred are media comprising one or more compounds of groups 1, 2 and 3 or of groups 1, 2 and 4, more preferred of groups 1, 2 and 3.

Compounds of the groups 1, 2, 3 and 4 having a molecular weight of 425 or more, more preferably 450 or more are preferred. Liquid crystalline media according to the invention wherein the content of compounds having a molecular weight less than 425, more preferably less than 450, is preferably 10% by weight or less, more preferably 5% by weight or less. The liquid crystalline media according to the invention preferably essentially consist of compounds with a molecular weight of 450 or more, more preferably of 470 or more.

For illustration, the following compounds and their molecular weights are provided:

TABLE

Structures and their molecular weights

| Structure | Molecular weight |
|---|---|
| 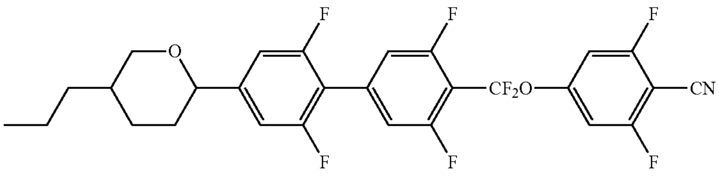 | 555.5 |
| 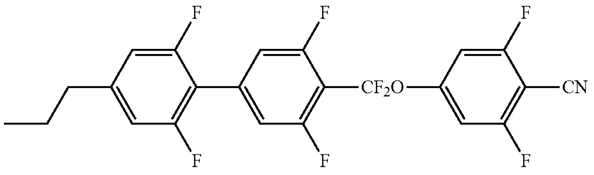 | 471.4 |
| 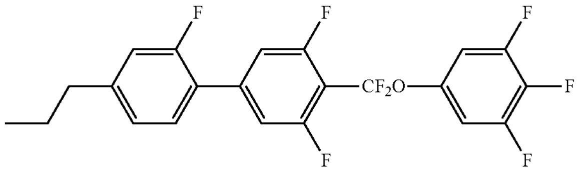 | 446.3 |
| 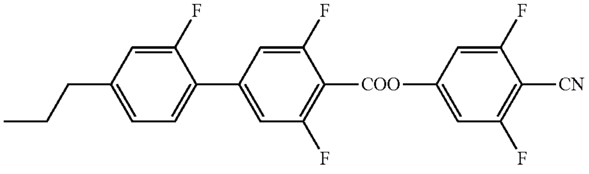 | 431.4 |
| 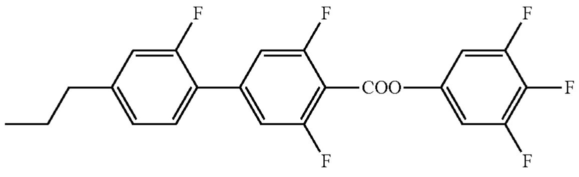 | 424.3 |

TABLE-continued

| Structures and their molecular weights | |
|---|---|
| Structure | Molecular weight |
| 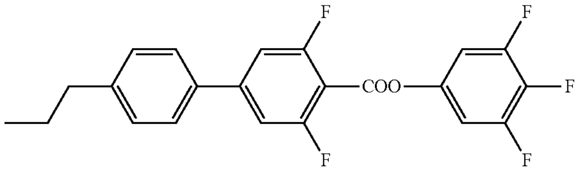 | 406.4 |

The compounds of the formula IC can be prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

Compounds of the formula I in general and particularly of formula IC can advantageously be prepared as shown in the following illustrative synthesis and the examples (schemes 1 and 2).

Scheme 1. General synthesis scheme for the preparation of compounds of the formula IC ($Z^{1C}$ = —C(O)O—), and $R^{1C}$ and $X^{1C}$ are defined in accordance with formula IC.

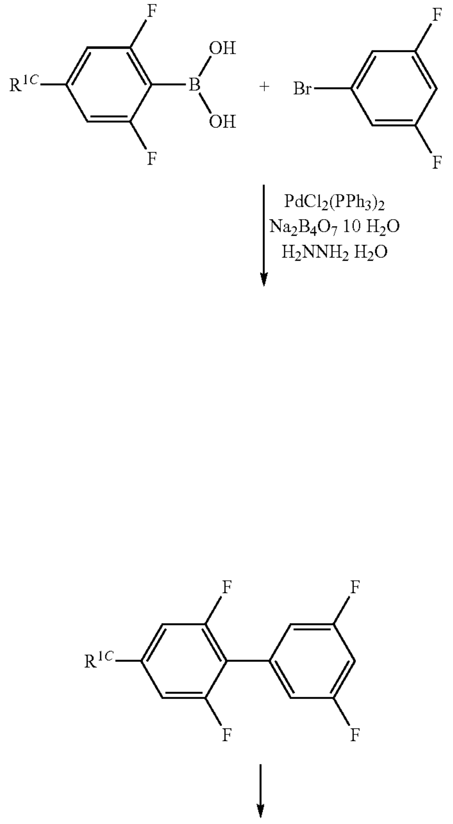

-continued

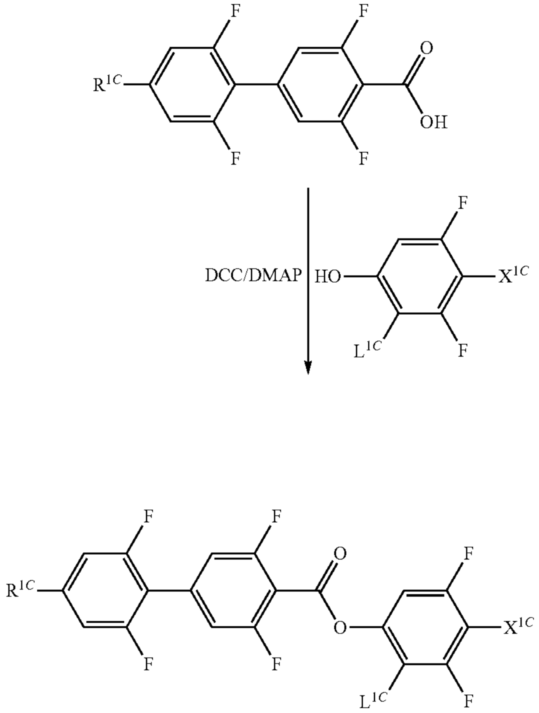

An alternative reaction path is presented here in synthesis scheme 2 for the preparation of corresponding difluoromethyleneoxy (—$CF_2$—O—) compounds.

Scheme 2. General synthesis scheme for the preparation of compounds of the formula IC in which $Z^{1C}$ = —$CF_2O$—, and $R^{1C}$ and $X^{1C}$ are defined in accordance with formula IC.

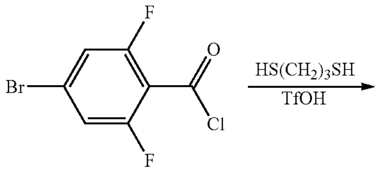

-continued

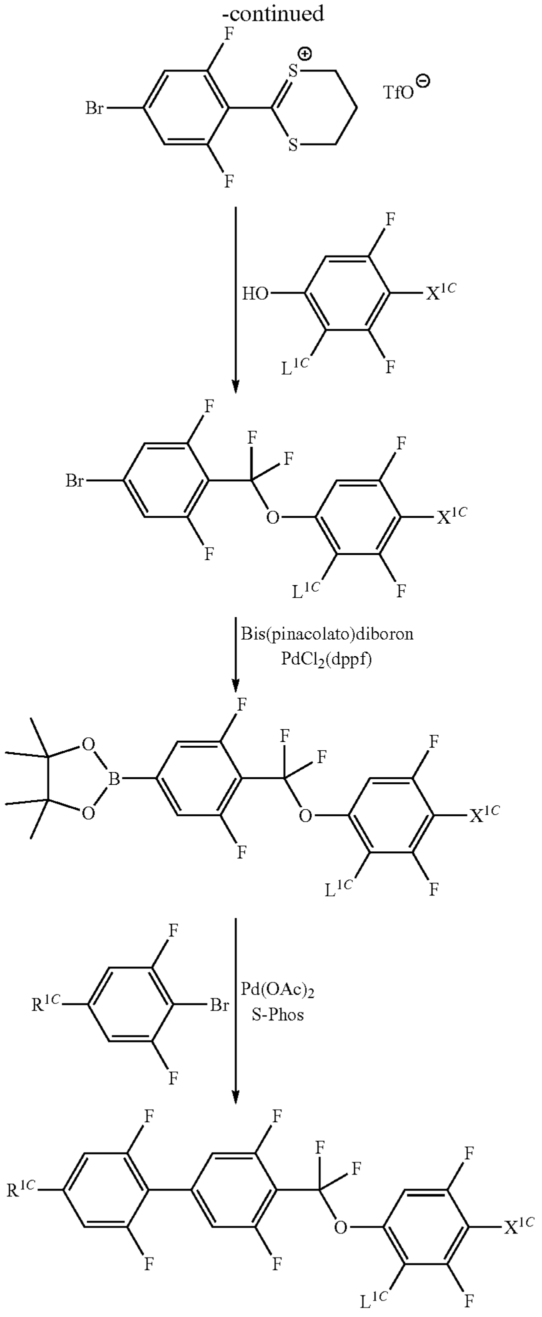

Corresponding starting materials can generally readily be prepared by the person skilled in the art by synthetic methods known from the literature or are commercially available.

The reaction methods and reagents used are in principle known from the literature. Further reaction conditions are exemplified by the working examples.

Further preferred process variants, not mentioned above, are revealed by the examples or the claims.

The process and the subsequent work-up of the reaction mixtures obtained by the above processes can basically be carried out as a batch reaction or in a continuous reaction procedure. The continuous reaction procedure encompasses, for example, reaction in a continuous stirred-tank reactor, a stirred-tank reactor cascade, a loop or cross-flow reactor, a flow tube or in a microreactor. The reaction mixtures are optionally worked up, as necessary, by filtration through solid phases, chromatography, separation between immiscible phases (for example extraction), adsorption onto solid supports, removal of solvents and/or azeotropic mixtures by distillation, selective distillation, sublimation, crystallisation, co-crystallisation or by nanofiltration on membranes.

In the present disclosure, the 2,5-disubstituted dioxane ring of the formula

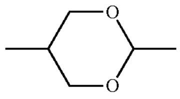

preferably denotes a 2,5-trans-configured dioxane ring, i.e., the substituents R are preferably both in the equatorial position in the preferred chair conformation. The 2,5-disubstituted tetrahydropyran of the formula

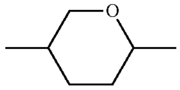

likewise preferably denotes a 2,5-trans-configured tetrahydropyran ring, i.e., the substituents are preferably both in the equatorial position in the preferred chair conformation.

The invention also relates to liquid crystal media comprising one or more of the compounds of the formula I (formulae IA, IB and IC) according to the invention. The liquid crystal media preferably comprise at least two components, preferably each one having a ferroelectric nematic phase itself. They are preferably obtained by mixing the components with one another. A process according to the invention for the preparation of a liquid crystalline medium is therefore characterised in that at least one compound of the formula I (formulae IA, IB and IC) is mixed with at least one further mesogenic, preferably ferroelectric nematic, compound, and additives are optionally added.

The achievable combinations of temperature range of the ferroelectric nematic phase, clearing point, dielectric anisotropy and response time for liquid crystal media containing the compounds of formulae IA, and/or IB and/or IC are far superior to previous materials of such kind from the prior art. Previously only single compound materials were available with limited choice, which all do not have a ferroelectric nematic phase range over suitable temperatures.

The mixtures according to the invention generally exhibit very broad nematic phase ranges having clearing points of 65° C. or more, and broad ferroelectric nematic phase ranges as well.

The liquid crystal media according to the invention preferably exhibit a temperature range of the ferroelectric nematic phase which is 20 degrees wide or more, preferably it extends over a range of 30 degrees or more, more preferably of 40 degrees or more. The respective phase range can be monotropic or enantiotropic, preferably it is enantiotropic.

Preferably the liquid crystal media according to the invention preferably exhibit the ferroelectric nematic phase from 20° C. or below to 30° C. or above, more preferably from 10° C. or below to 40° C. or above, more preferably from 0° C. or below to 50° C. or above and, most preferably, from −20° C. or below to 60° C. or above.

In another preferred embodiment the liquid crystal media according to the invention preferably exhibit the ferroelectric nematic phase from 20° C. or below to 30° C. or above, more preferably from 10° C. or below to 35° C. or above, more preferably from 0° C. or below to 40° C. or above and, most preferably, from −20° C. or below to 45° C. or above.

In another preferred embodiment the liquid crystal media according to the invention preferably exhibit the ferroelectric nematic phase from 20° C. or below to 50° C. or above, more preferably from 10° C. or below to 70° C. or above, more preferably from 0° C. or below to 90° C. or above and, most preferably, from −20° C. or below to 100° C. or above.

This means, the media exhibit the $N_f$-phase at least in the given intervals.

The liquid crystal media according to the invention exhibit outstanding dielectric properties.

Preferably they have values of $\varepsilon_{\parallel}$ in the range from 1,400 to 10,000, more preferably from 1,600 to 3,000, more preferably from 1,800 to 2,600 and, most preferably from 2,000 to 2,500.

Preferably they have values of $\varepsilon_r$ at 10 Hz of 20,000 or more, more preferably from 25,000 to 90,000, more preferably from 30,000 to 75,000, most preferably from 38,000 to 60,000.

These dielectric properties are achieved at temperatures at which the media are in the ferroelectric nematic phase. The dielectric characteristics may show a hysteresis behaviour and in that case the values obtained at a certain temperature may depend on the history of the material, i.e. whether the material is being heated up or cooled down.

This effect enables, amongst others, the operation of devices e.g. in bistable modes, which may be used beneficially in electro-optical devices, as e.g. known from ferroelectric smectic devices.

The liquid crystal media according to the invention preferably comprise 2 to 40, particularly preferably 4 to 20, compounds as further constituents besides one or more compounds according to the invention. In particular, these media may comprise 1 to 25 components besides one or more compounds according to the invention. These further constituents are preferably selected from ferroelectric nematic or nematogenic (monotropic or isotropic) substances.

Prior art ferroelectric substances and similar compounds with high dielectric anisotropy for combination with the current substances are selected from e.g. the following structures:

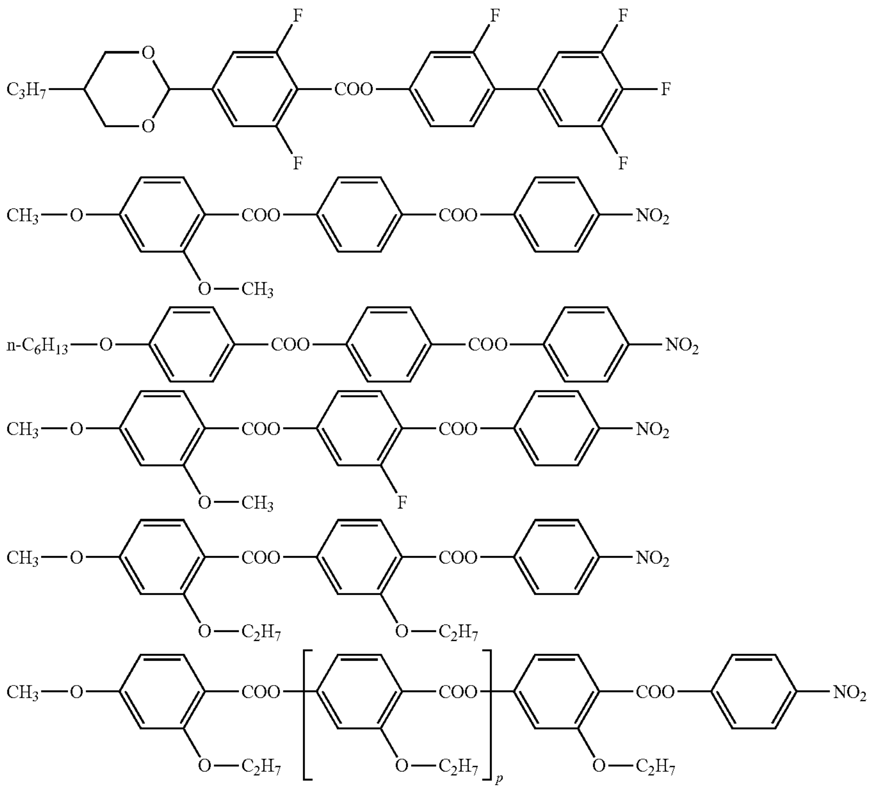

Preferably they have values of $\varepsilon_{\perp}$ in the range from 1,000 to 2,300, more preferably from 1,200 to 2,100, more preferably from 1,400 to 2,300 and, most preferably from 1,500 to 2,500.

Preferably they have values of $\Delta\varepsilon$ of 300 or more, more preferably from 400 to 2,100, more preferably from 1,400 to 2,300 and, most preferably from 1,500 to 2,500.

wherein p is 1, 2, 3, 4 or 5.

The media according to the invention preferably comprise 1% to 100%, more preferably 10% to 100% and, particularly preferably, 50% to 100%, of the compounds of formulae IA and/or IB and/or IC.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The liquid-crystal mixtures may also comprise further additives known to the person skilled in the art and described in the literature. For example, 0 to 15%, preferably 0 to 10%, of pleochroic dyes, chiral dopants, stabilisers or nanoparticles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds, are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a ferroelectric nematic liquid-crystal material having positive dielectric anisotropy and high specific resistance located in the cell) which contain media of this type. The invention further relates to the use of these media for electro-optical purposes.

The expression "alkyl" encompasses unbranched and branched alkyl groups having 1 to 15 carbon atoms, in particular and preferably the unbranched groups methyl, ethyl, n-propyl, n-butyl, n-pentyl, n-hexyl and n-heptyl and further, alternatively, the groups n-butyl, n-pentyl, n-hexyl and n-heptyl substituted by one methyl, ethyl or propyl. Groups having 2-5 carbon atoms are generally preferred.

The expression "alkenyl" encompasses unbranched and branched alkenyl groups having up to 15 carbon atoms, in particular the unbranched groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having 2 to 5 carbon atoms are generally preferred.

The expression "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$. The expression "halogenated alkenyl radical" and related expressions are explained correspondingly.

The total amount of compounds of the individual formulae IA and/or IB and/or IC in the mixtures according to the invention is not crucial. The mixtures may therefore comprise one or more further components for the purposes of optimisation of various properties.

The construction of a matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

An essential difference between the displays according to the invention and the hitherto conventional ones based on the twisted nematic cell consists, however, in the choice of the liquid-crystal parameters of the liquid-crystal layer.

The following examples explain the invention without intending to restrict it. The person skilled in the art will be able to glean from the examples working details that are not given in detail in the general description, generalise them in accordance with general expert knowledge and apply them to a specific problem.

Above and below, percentage data denote percent by weight. All temperature values indicated in the present application, such as, for example, the melting point T(C,N), the smectic (Sm) to nematic (N) phase transition T(S,N) and the clearing point T(N,I), resp. T($N_f$,I), are indicated in degrees Celsius (° C.) and all temperature differences are correspondingly indicated in differential degrees (° or degrees), unless explicitly indicated otherwise. Furthermore, C=crystalline state, N=nematic phase, Nf=ferroelectric nematic phase, Sm=smectic phase (more especially SmA, SmB, etc.), Tg=glass-transition temperature and I=isotropic phase. The data between these symbols represent the transition temperatures. Δn denotes optical anisotropy (589 nm, 20° C.), Δε the dielectric anisotropy (1 kHz, 20° C.).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The occurrence of the ferroelectric nematic phase of the materials is identified using differential scanning calorimetry (DSC), via observation of the textures under a polarising microscope equipped with a hot-stage for controlled cooling resp. heating and additionally confirmed by temperature dependent determination of the dielectric properties.

The dielectric anisotropy Δε of the individual substances is determined at 20° C. and 1 kHz. To this end, 5 to 10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm by linear extrapolation.

The dielectric permittivity (ε) of the materials, especially in the ferroelectric nematic phase is directly determined by measuring the capacitance of at least one test cell containing the compound and having cell thickness of 25 μm with homeotropic and with homogeneous alignment, respectively. Temperature is controlled by a Novocontrol Novocool system set to temperature gradients of +/−1 K/min; +/−2 K/min; +/−5 K/min; +/−10 K/min applied to the sample cell. Capacitance is measured by a Novocontrol alpha-N analyzer at a frequency of 10 Hz or 1 kHz with a typical voltage<50 mV down to 0.1 mV in order make sure to be below the threshold of the investigated compound. Measurements are performed both upon heating and upon cooling of the sample(s). For simplicity the relative dielectric permittivity ($\varepsilon_r$) is used here, which is defined as $$\varepsilon_r=\varepsilon/\varepsilon_0.$$

In the present application, unless expressly indicated otherwise, the plural form of a term denotes both the singular form and the plural form, and vice versa. Further combinations of the embodiments and variants of the invention in accordance with the description also arise from the appended claims or from combinations of a plurality of these claims.

EXAMPLES

The present invention is described in detail by the following non-restrictive examples.

Compound Examples

Compound Example 1: Synthesis of UUQU-4-N

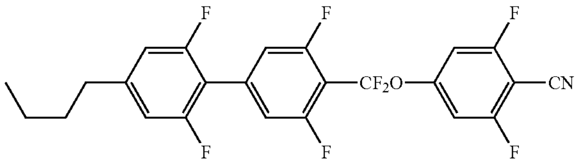

Step 1.1

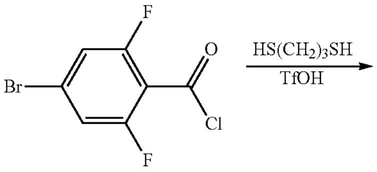

3

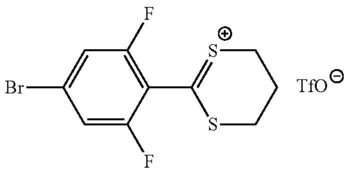

4

20.3 ml (203 mmol) 1,3-propanedithiol was dissolved in 25.9 ml of toluene and warmed to 80° C. A solution of 34.5 g (135.1 mmol) 3, 0.2 ml trifluoromethanesulfonic acid and 40 ml toluene was prepared and added dropwise to the dithiol solution at 80° C. After the addition was complete the mixture was stirred at 80° C. for 45 min, and then cooled to 20° C. 17.7 ml (200 mmol) trifluoromethanesulfonic acid was added dropwise during a period of 80 min keeping the temperature below 25° C. The toluene was distilled off at 80° C. and 40 mbar, 25 ml of additional toluene was added, and all volatiles were distilled off again. The crystalline residue was used for the next step without further purification.

Step 1.2

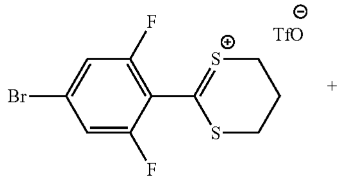

4

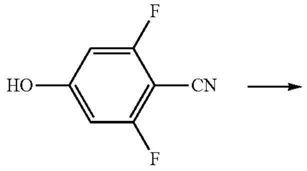

5

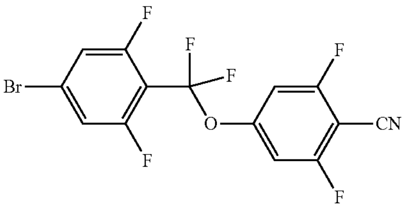

6

93.1 g (0.6 mol) 5 was suspended in 1.6 L dichloromethane and cooled to 6° C. 83.2 ml (0.6 mol) triethylamine was added dropwise at 5° C., followed by 230 g (0.5 mol) of salt 4. The mixture was stirred at 5° C. for 30 min, then cooled to −75° C. and 244.3 ml (1.5 mol) triethylamine trihydrofluoride was added dropwise. The solution was stirred for one hour at −75° C., and 128 ml (2.5 mol) of bromine dissolved in 400 ml dichloromethane was added. The mixture was stirred for 1.5 h at −70° C. and allowed to warm to 0° C. After the usual workup 132 g (62%) of 6 was obtained as slightly beige crystals.

Step 1.3

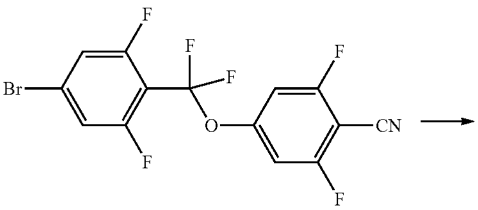

6

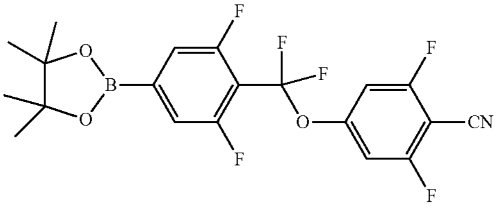

7

13.8 g (35 mmol) 6 was dissolved in 150 ml 1,4-dioxane, 1.0 g (1.4 mmol) palladium acetate, 10.4 g (0.1 mol)

potassium acetate and 13.9 g (53 mmol) bis(pinacolato) boron were added. The mixture was heated under reflux overnight. After the usual workup 12.4 g (80%) of 7 was obtained as slightly yellow crystals.

Step 1.4

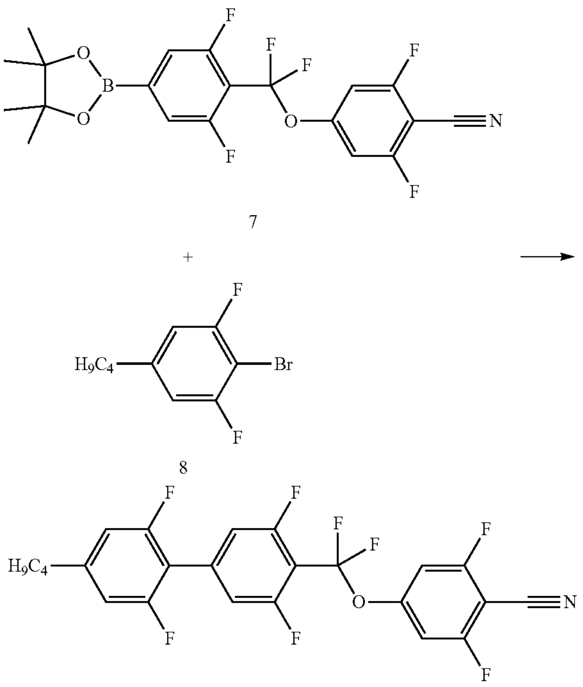

7

+

8

9

5.4 g (23 mmol) potassium phosphate was dissolved in 10 ml water. 80 ml of toluene, 2.8 g (11.4 mmol) 1-bromo-2,6-difluoro-4-butyl benzene 8, 6.3 g (14.2 mmol) 7, 42.2 mg (0.2 mmol) palladium acetate and 126.7 mg (0.3 mmol) S-Phos (2-dicyclohexylphosphino-2',6'-dimethoxybiphenyl) were added and the mixture was heated under reflux overnight. After the usual workup 3.42 g (62%) 9 (UUQU-4-N) was obtained as colorless crystals.

$^1$H NMR (400 MHz, Chloroform-d) δ 7.16 (d, J=11.0 Hz, 2H), 7.07-6.99 (m, 2H), 6.91-6.81 (m, 2H), 2.69-2.61 (m, 2H), 1.69-1.57 (m, 2H), 1.39 (h, J=7.4 Hz, 2H), 0.96 (t, J=7.3 Hz, 3H).

Molecular Weight: 485.4.

Melting point: 44° C., Clearing point: 21° C.

Data extrapolated from 10% solution in ZLI-4792: Δn(20° C.)=0.120 and Δε(20° C.)=54.6.

Characterization of Ferroelectric-Nematic Behavior

The materials, compounds as well as the mixtures are observed under a polarizing microscope with a temperature controlled hot-stage. Their texture are observed and recorded on video. Their unique LC textures characteristic for ferroelectric nematic phase(s) are confirmed.

The dielectric properties are also determined.

TABLE

Measurement of ε at different temperatures (cooling rate of 1°/min, non-oriented sample on metal surface, leads to $\varepsilon_{av}$.)

| T/° C. | ε av. (1 kHz, T) | Remark |
|---|---|---|
| 5.0 | 2.34 | crystalline on cooling down |
| 7.0 | 7,730 | |
| 10.0 | 11,300 | |
| 12.0 | 13,800 | |
| 14.0 | 16,500 | |
| 16.0 | 19,100 | |
| 18.0 | 21,500 | |
| 19.8 | 23,100 | ε max. |
| 20.0 | 22,800 | |
| 20.5 | 2.39 | transition $N_f$-isotropic |
| 21.0 | 2.39 | |
| 22.0 | 2.40 | |

Compound Example 2: Synthesis of UUZU-4-N

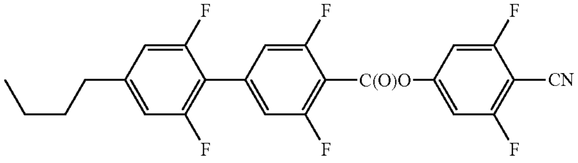

Step 2.1

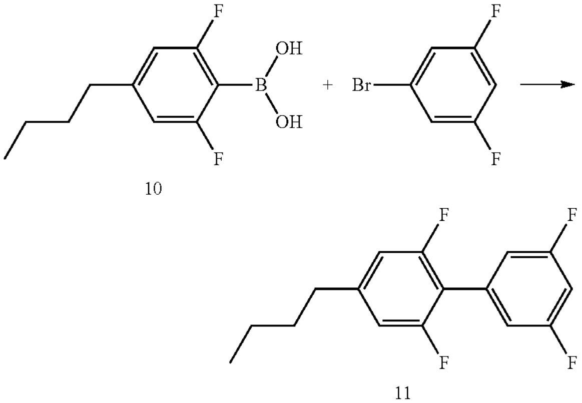

10

11

Step 2.2

57.2 g (150 mmol) disodiumtetraborate-decahydrate, 2.8 g (4 mmol) palladium chloride, 0.2 g (4 mmol) hydrazinium hydroxide, 39.4 g (0.2 mol) 1-bromo-3,5-difluorobenzene, 42.8 g (0.2 mol) 10 and 200 ml of water were combined. The mixture was heated to reflux for 6 h. After the usual workup 50 g (88%) of 11 was obtained.

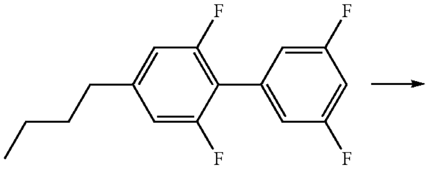

11

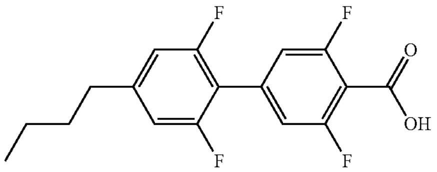

12

Step 2.3

50 g (175 mmol) 11 was dissolved in 300 ml tetrahydrofuran and cooled to −75° C. 118 ml (193 mmol) of 15% n-butyllithum in hexane was added dropwise below −70° C. and the mixture was stirred at that temperature for 1.5 h. The mixture was poured onto 500 g of solid carbon dioxide and allowed to warm to room temperature. After the usual workup 46.8 g (82%) of 12 was obtained as colorless crystals.

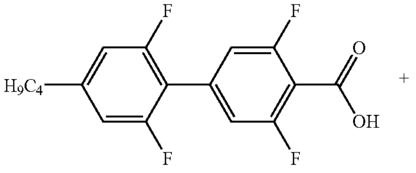

12

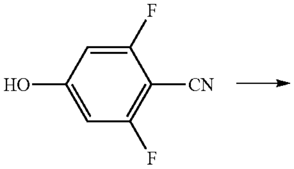

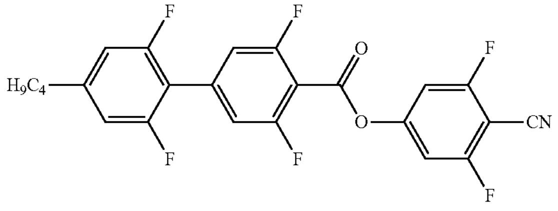

13

Step 2.4

16.3 g (50 mmol) 12, 8.5 g (55 mmol) 1-cyano-2,6-difluoro-4-hydroxybenzene and 611 mg (5 mmol) 4-dimethylaminopyridine were combined with 200 ml dichloromethane and cooled to 0° C. Between 0 and 5° C. a solution of 11.3 g (55 mmol) N,N-dicyclohexylcarbodiimide in 50 ml dichloromethane was added dropwise. The mixture was then warmed to room temperature and stirred overnight. 1.4 g oxalic acid was added, and everything was stirred another 1.5 h. After the usual workup 20.5 g (88%) 13 (UUZU-4-N) was obtained.

$^1$H NMR (500 MHz, Chloroform-d) δ 7.23-7.17 (m, 2H), 7.15-7.08 (m, 2H), 6.91-6.83 (m, 2H), 2.69-2.62 (m, 2H), 1.69-1.59 (m, 2H), 1.39 (h, J=7.4 Hz, 2H), 0.96 (t, J=7.4 Hz, 3H).

Phases: C 69 $N_f$/N 93 I.

Data extrapolated from 10% solution in ZLI-4792: Δn(20° C.)=0.159 and Δε20° C.)=70.3.

Compound Example 3: Synthesis of UUZU-5-N

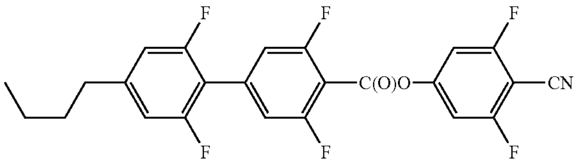

The compound is prepared in analogy to Example 2.

Melting point: 80° C.

Data extrapolated from 10% solution in ZLI-4792: Δn(20° C.)=0.162 and Δε(20° C.)=80.5.

In analogy to Examples 1 and 2 the following compounds are prepared:

In the following table(s) the following abbreviations for the end groups are used

| 0 | H— |
|---|---|
| $c-C_3H_5$ |  |
| $c-C_3H_5CH_2$ | 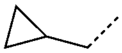 |
| $c-C_4H_7$ |  |
| $c-C_5H_7$ | 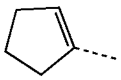 |
| $c-C_5H_9$ | 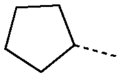 |
| and | |
| $c-C_5H_9CH_2$ | 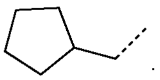 |

General Structure

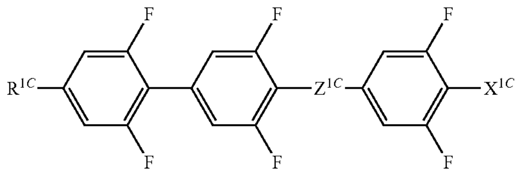

TABLE

| Further compound examples | | | | |
|---|---|---|---|---|
| Example no. | $R^{1C}$ | $Z^{1C}$ | $X^{1C}$ | M. p. |
| 3. | H | COO | CN | |
| 4. | $CH_3$ | COO | CN | |
| 5. | $C_2H_5$ | COO | CN | 135° C. |
| 6. | n-$C_3H_7$ | COO | CN | 104° C. |
| 7. | $C_2H_5CH(CH_3)CH_2$ | COO | CN | |
| 8. | n-$C_6H_{13}$ | COO | CN | 60° C. |
| 9. | n-$C_7H_{15}$ | COO | CN | |
| 10. | n-$C_3H_7CH(C_2H_5)CH_2$ | COO | CN | |
| 11. | n-$C_8H_{17}$ | COO | CN | |
| 12. | c-$C_3H_5$ | COO | CN | |
| 13. | c-$C_3H_5CH_2$ | COO | CN | |
| 14. | c-$C_4H_7$ | COO | CN | |
| 15. | c-$C_5H_7$ | COO | CN | |
| 16. | c-$C_5H_9$ | COO | CN | |
| 17. | c-$C_5H_9CH_2$ | COO | CN | |
| 18. | $CH_2{=}CH$ | COO | CN | |
| 19. | $CH_3CH{=}CH$ | COO | CN | |
| 20. | $CH_2{=}CH(CH_2)_2$ | COO | CN | |
| 21. | $CH_3O$ | COO | CN | |
| 22. | $C_2H_5O$ | COO | CN | 104° C. |
| 23. | n-$C_3H_7O$ | COO | CN | |
| 24. | n-$C_4H_9O$ | COO | CN | |
| 25. | n-$C_5H_{11}O$ | COO | CN | |
| 26. | H | $CF_2O$ | CN | |
| 27. | $CH_3$ | $CF_2O$ | CN | |
| 28. | $C_2H_5$ | $CF_2O$ | CN | 84° C. |
| 29. | n-$C_3H_7$ | $CF_2O$ | CN | 73° C. |
| 30. | n-$C_5H_{11}$ | $CF_2O$ | CN | 39° C. |
| 31. | $C_2H_5CH(CH_3)CH_2$ | $CF_2O$ | CN | |
| 32. | n-$C_6H_{13}$ | $CF_2O$ | CN | 36° C. |
| 33. | n-$C_7H_{15}$ | $CF_2O$ | CN | |
| 34. | n-$C_3H_7CH(C_2H_5)CH_2$ | $CF_2O$ | CN | |
| 35. | n-$C_8H_{17}$ | $CF_2O$ | CN | |
| 36. | c-$C_3H_5$ | $CF_2O$ | CN | |
| 37. | c-$C_3H_5CH_2$ | $CF_2O$ | CN | |
| 38. | c-$C_4H_7$ | $CF_2O$ | CN | |
| 39. | c-$C_5H_7$ | $CF_2O$ | CN | |
| 40. | c-$C_5H_9$ | $CF_2O$ | CN | |
| 41. | c-$C_5H_9CH_2$ | $CF_2O$ | CN | |
| 42. | $CH_2{=}CH$ | $CF_2O$ | CN | |
| 43. | $CH_3CH{=}CH$ | $CF_2O$ | CN | |
| 44. | $CH_2{=}CH(CH_2)_2$ | $CF_2O$ | CN | |
| 45. | $CH_3O$ | $CF_2O$ | CN | |
| 46. | $C_2H_5O$ | $CF_2O$ | CN | |
| 47. | n-$C_3H_7O$ | $CF_2O$ | CN | |
| 48. | n-$C_4H_9O$ | $CF_2O$ | CN | |
| 49. | n-$C_5H_{11}O$ | $CF_2O$ | CN | |

M. p.: Melting point.

Further combinations of the embodiments of the current invention and variants of the invention are also disclosed by the claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

This applies both to the media as compositions with their constituents, which can be groups of compounds as well as individual compounds, and also to the groups of compounds with their respective constituents, the compounds. Only in relation to the concentration of an individual compound relative to the medium as a whole does the term comprise mean: the concentration of the compound or compounds in question is preferably 1% or more, particularly preferably 2% or more, very particularly preferably 4% or more.

For the present invention, "≤" means less than or equal to, preferably less than, and "≥" means greater than or equal to, preferably greater than.

For the present invention

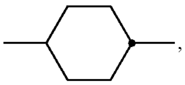,
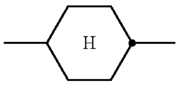
and
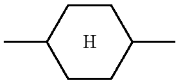

denote trans-1,4-cyclohexylene,

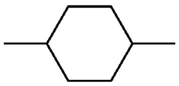

denotes a mixture of both cis- and trans-1,4-cyclohexylene and

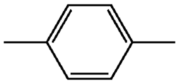
and

denote 1,4-phenylene.

For the present invention, the expression "dielectrically positive compounds" means compounds having a Δε of >1.5, the expression "dielectrically neutral compounds" means compounds having −1.5≤Δε≤1.5 and the expression "dielectrically negative compounds" means compounds having Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 KHz. The measurement voltage is typically 0.5 V to 1.0 V, but is always lower than the capacitive threshold of the respective liquid-crystal mixture (material) investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

For the purposes of the present invention, all concentrations are, unless explicitly noted otherwise, indicated in percent by weight and relate to the corresponding mixture as a whole or mixture constituents, again a whole, unless explicitly indicated otherwise. In this context the term "the mixture" describes the liquid crystalline medium.

The following symbols are used, unless explicitly indicated otherwise: T(N,I) resp. T($N_f$,I) (or clp.)

clearing point [° C.],

Dielectric properties at 1 KHz and preferably at 20° C. or at the respective temperature specified:

$\varepsilon_{\perp}$ dielectric susceptibility perpendicular to the director, $\varepsilon_{||}$ dielectric susceptibility parallel to the director, $\Delta\varepsilon$ dielectric anisotropy and especially for the screening data of single compounds and $\varepsilon_{av.}$ average dielectric susceptibility.

And, in particular for the data from the screening of the respective compounds in the nematic host mixture ZLI-4792,:

$n_e$ extraordinary refractive index measured at 20° C. and 589 nm, $n_o$ ordinary refractive index measured at 20° C. and 589 nm and $\Delta n$ optical anisotropy measured at 20° C. and 589 nm.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

TABLE A

| Ring elements | |
|---|---|
| C | 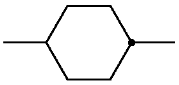 |
| D | 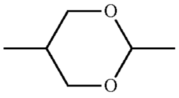 |
| DI | 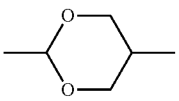 |
| A | 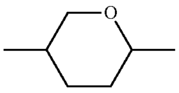 |
| AI | 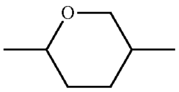 |
| P | 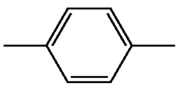 |

TABLE A-continued

| Ring elements | |
|---|---|
| G | 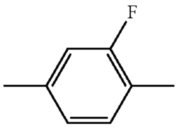 |
| GI | 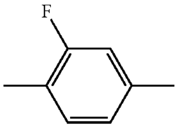 |
| U | 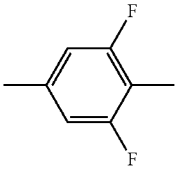 |
| UI | 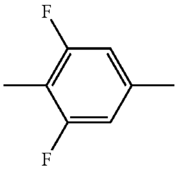 |
| Y | 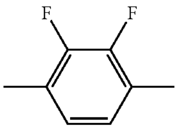 |
| P(F,Cl)Y | 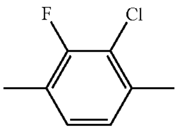 |
| P(Cl,F)Y | 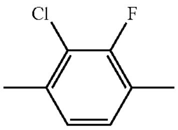 |
| np | 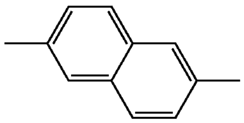 |
| n3f | 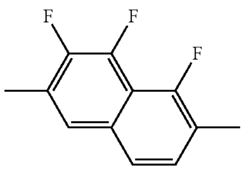 |
| nN3fl | 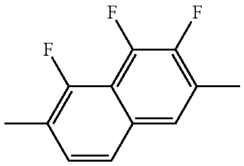 |

TABLE A-continued
| Ring elements | |
|---|---|
| th | 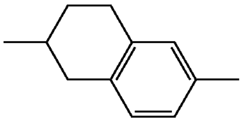 |
| thl | 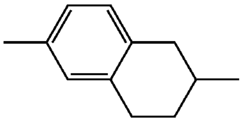 |
| tH2f | 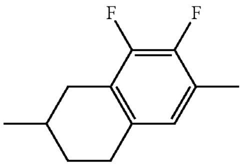 |
| tH2fl | 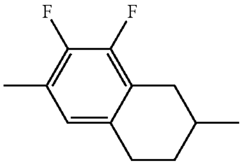 |
| o2f | 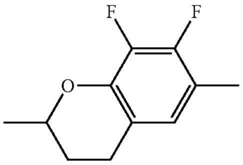 |
| o2fl | 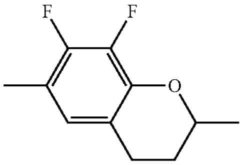 |
| dh | 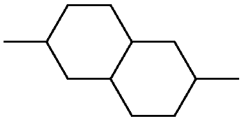 |
| B | 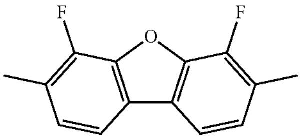 |
| O | 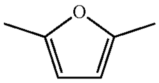 |
| S | 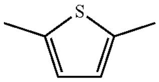 |
| K | 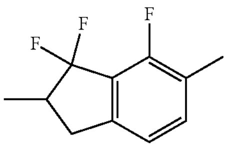 |
TABLE A-continued
| Ring elements | |
|---|---|
| KI | 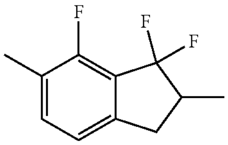 |
| L | 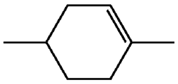 |
| LI | 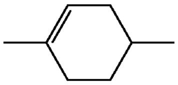 |
| F | 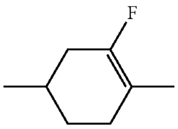 |
| FI | 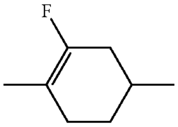 |
| Bh | 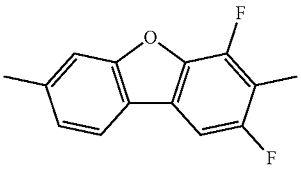 |
| Bh(S) | 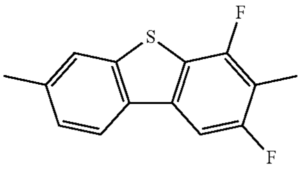 |
| Bf | 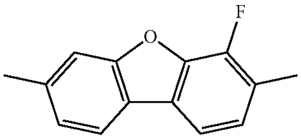 |
| Bf(S) | 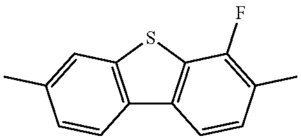 |

TABLE A-continued

| Ring elements | |
|---|---|
| Bfi | 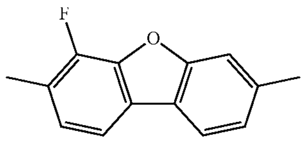 |
| Bfi(S) | 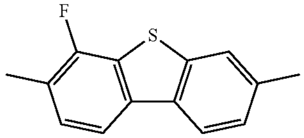 |

TABLE B

| Bridging units | | | |
|---|---|---|---|
| E | $—CH_2—CH_2—$ | | |
| V | —CH═CH— | | |
| T | —C≡C— | | |
| W | $—CF_2—CF_2—$ | | |
| B | —CF═CF— | | |
| Z | —CO—O— | ZI | —O—CO— |
| X | —CF═CH— | XI | —CH═CF— |
| O | $—CH_2—O—$ | OI | $—O—CH_2—$ |
| Q | $—CF_2—O—$ | QI | $—O—CF_2—$ |

TABLE C

| End groups | | | |
|---|---|---|---|
| On the left individually or in combination | | On the right individually or in combination | |
| -n- | $C_nH_{2n+1}—$ | -n | $—C_nH_{2n+1}$ |
| -nO- | $C_nH_{2n+1}—O—$ | -On | $—O— C_nH_{2n+1}$ |
| -V- | $CH_2═CH—$ | -V | $—CH═CH_2$ |
| -nV- | $C_nH_{2n+1}—CH═CH—$ | -nV | $—C_nH_{2n}—CH═CH_2$ |
| -Vn- | $CH_2═CH— C_nH_{2n}—$ | -Vn | $—CH═CH—C_nH_{2n+1}$ |
| -nVm- | $C_nH_{2n+1}—CH═CH—C_mH_{2m}—$ | -nVm | $— C_nH_{2n}—CH═CH—C_mH_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | $CFH_2—$ | -M | $—CFH_2$ |
| -D- | $CF_2H—$ | -D | $—CF_2H$ |
| -T- | $CF_3—$ | -T | $—CF_3$ |
| -MO- | $CFH_2O$ — | -OM | $—OCFH_2$ |
| -DO- | $CF_2HO$ — | -OD | $—OCF_2H$ |
| -TO- | $CF_3O$ — | -OT | $—OCF_3$ |
| -A- | H—C≡C— | -A | —C≡C—H |
| -nA- | $C_nH_{2n+1}—C≡C—$ | -An | $—C≡C—C_nH_{2n+1}$ |
| -NA- | N≡C—C≡C— | -AN | —C≡C—C≡N |
| On the left only in combination | | On the right only in combination | |
| - . . . n . . . - | $—C_nH_{2n}—$ | - . . . n . . . | $—C_nH_{2n}—$ |
| - . . . M . . . - | —CFH— | - . . . M . . . | —CFH— |
| - . . . D . . . - | $—CF_2—$ | - . . . D . . . | $—CF_2—$ |
| - . . . V . . . - | —CH═CH— | - . . . V . . . | —CH═CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF═CF— | - . . . W . . . | —CF═CF— |
| - . . . 0 . . . - | —H | | |

in which n and m are each integers (1, 2, 3, 4, 5, 6, 7, etc.), and the three dots " . . . " are placeholders for other abbreviations from this table.

Besides the compounds of formulae IA and/or IB and/or IC the mixtures according to the invention preferably comprise one or more compounds of the compounds mentioned below.

The following abbreviations are used:

(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "—Om" it preferably is 1, 2, 3 or 4, more preferably 2 or 4. The combination "-lVm" preferably is "2V1".)

For the present invention and in the following examples, the structures of the liquid-crystal compounds are indicated by means of acronyms, with the transformation into chemical formulae taking place in accordance with Tables A to C above. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE D
Exemplary, preferred compounds of formula IA
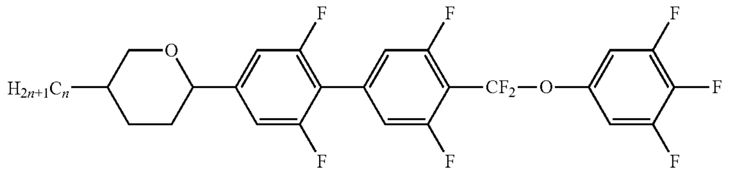
AUUQU-n-F
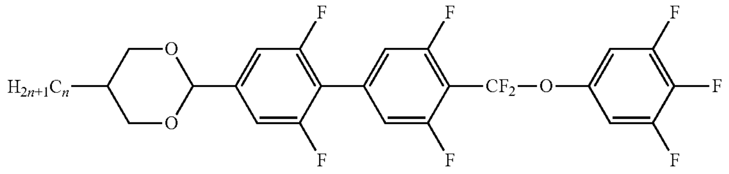
DUUQU-n-F
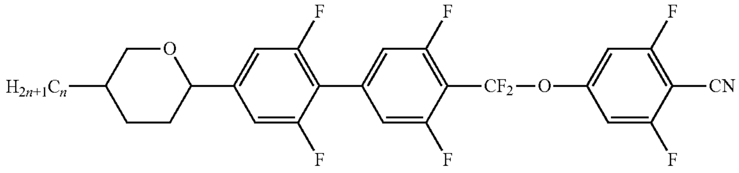
AUUQU-n-N
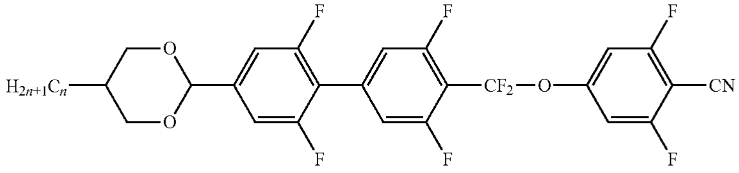
DUUQU-n-N
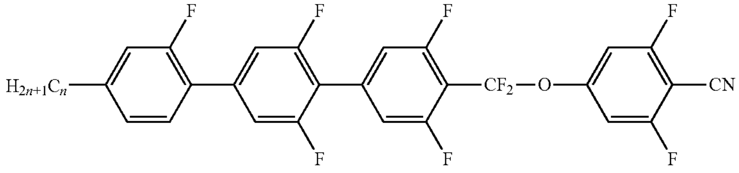
GUUQU-n-N
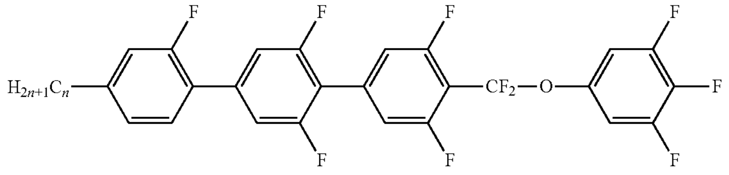
GUUQU-n-F
Exemplary, preferred compounds of formula IB
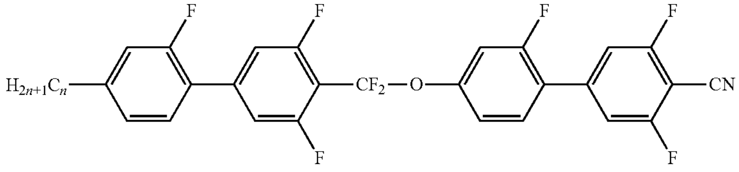
GUQGU-n-N TABLE D-continued
| Exemplary, preferred compounds of formula IA |
|---|
| 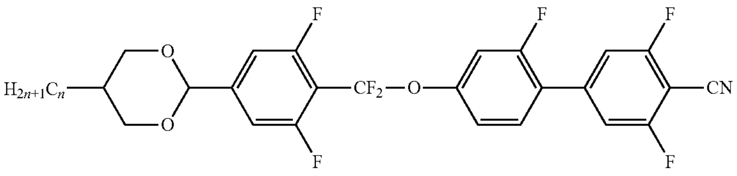 |
| DUQGU-n-N |
| 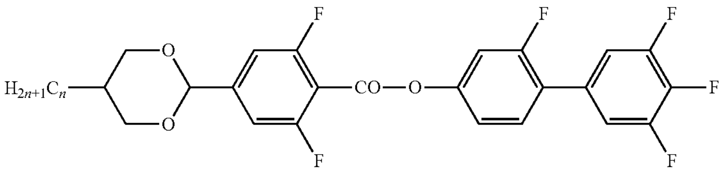 |
| DUZGU-n-F |
| Exemplary, preferred compounds of formula IC |
| 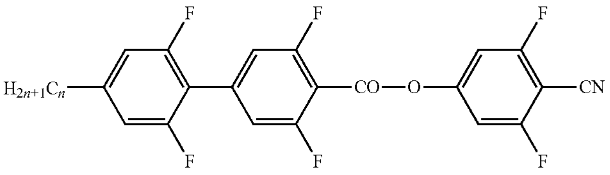 |
| UUZU-n-N |
| 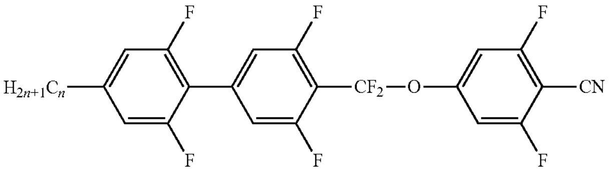 |
| UUQU-n-N |
| 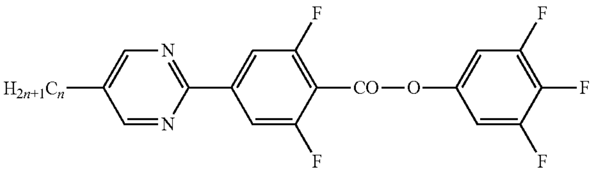 |
| MUZU-n-F |
| 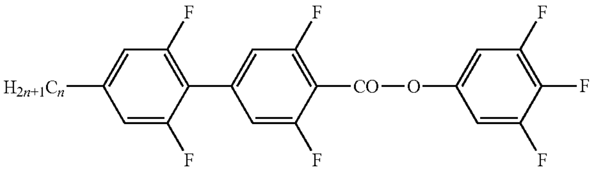 |
| UUZU-n-F |
| 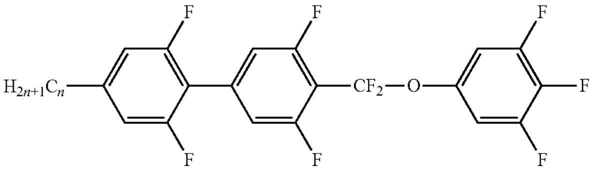 |
| UUQU-n-F |

TABLE D-continued
| Exemplary, preferred compounds of formula IA |
|---|
| 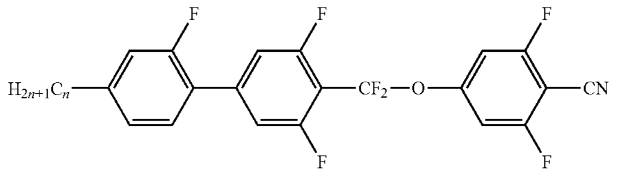 |
| GUQU-n-N |
| 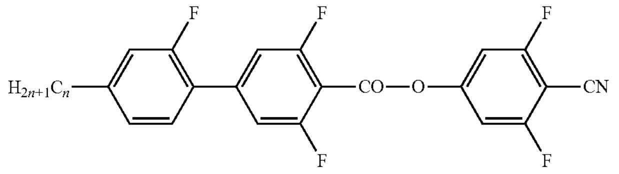 |
| GUZU-n-N |
| 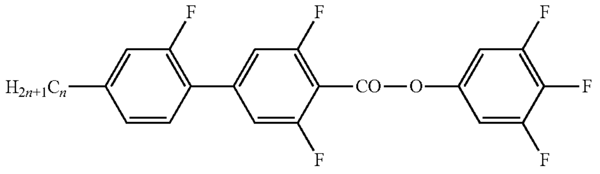 |
| GUZU-n-F |
| Further compounds preferably used |
| 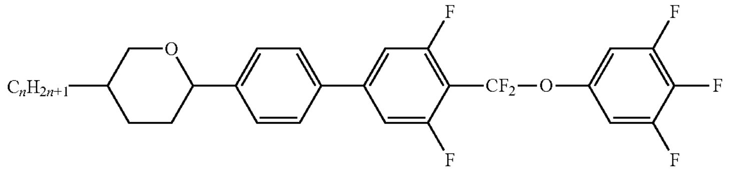 |
| APUQU-n-F |
| 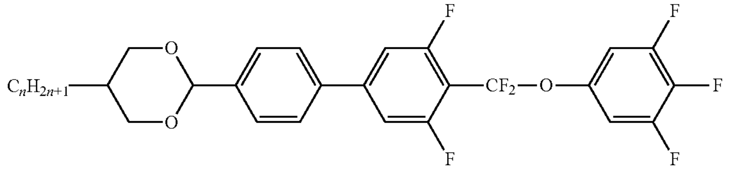 |
| DPUQU-n-F |
| 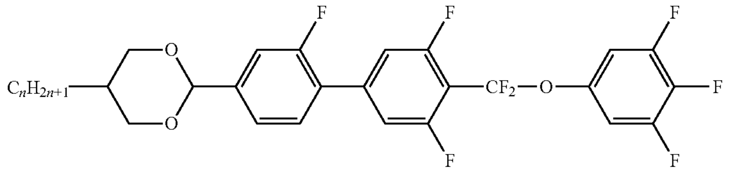 |
| DGUQU-n-F |
| 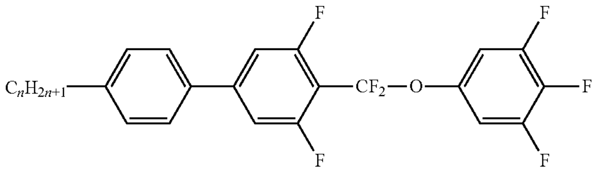 |
| PUQU-n-F |

TABLE D-continued
| Exemplary, preferred compounds of formula IA |
|---|
| 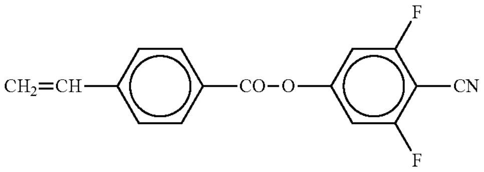 |
| PZU-V-N |
| 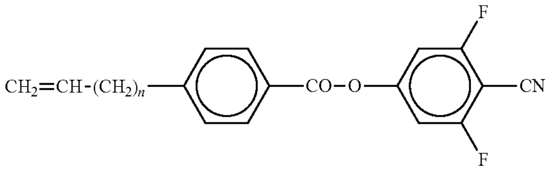 |
| PZU-Vn-N |
| 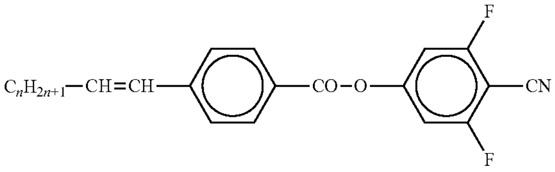 |
| PZU-nV-N |
| 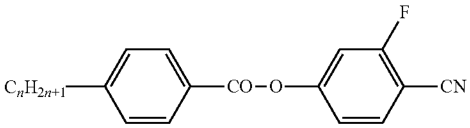 |
| PZG-n-N |
| 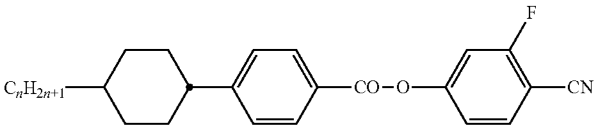 |
| CPZG-n-N |
| 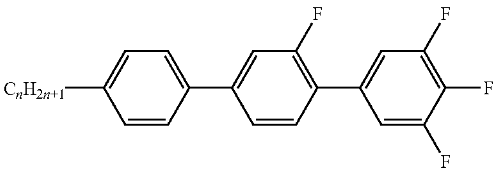 |
| PGU-n-F |
| 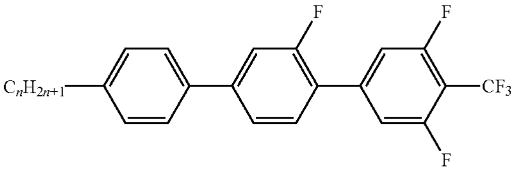 |
| PGU-n-T |

TABLE D-continued
Exemplary, preferred compounds of formula IA
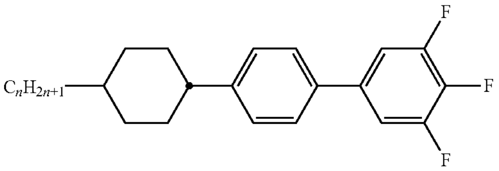
CPU-n-F
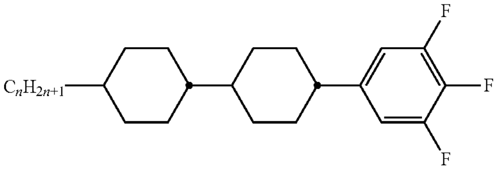
CCU-n-F
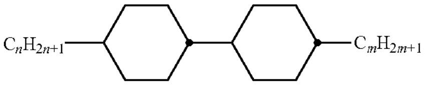
CC-n-m
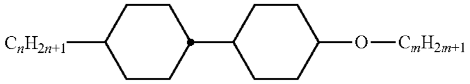
CC-n-Om
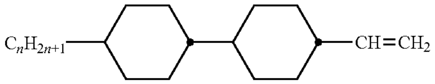
CC-n-V
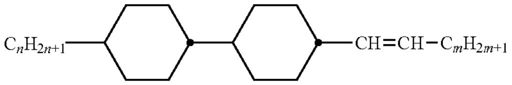
CC-n-Vm
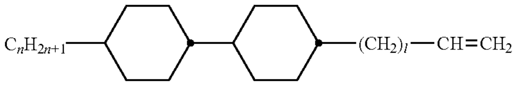
CC-n-IV
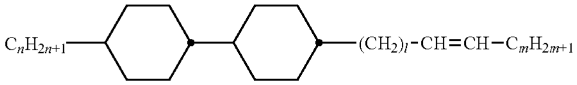
CC-n-IVm
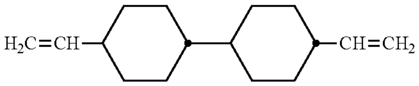
CC-V-V
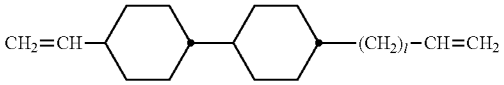
CC-V-IV TABLE D-continued
| Exemplary, preferred compounds of formula IA |
| --- |
| 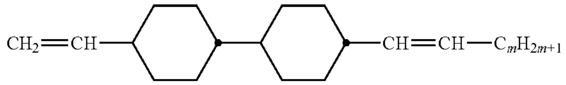 |
| CC-V-Vm |
| 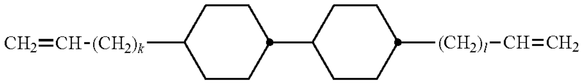 |
| CC-Vk-IV |
| 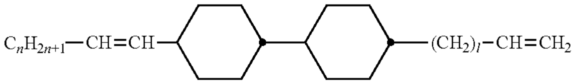 |
| CC-nV-IV |
| 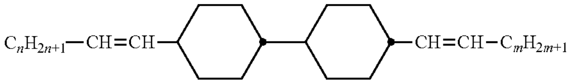 |
| CC-nV-Vm |
| 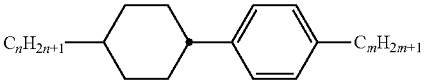 |
| CP-n-m |
| 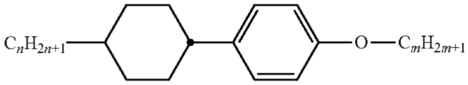 |
| CP-n-Om |
| 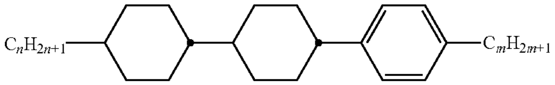 |
| CCP-n-m |
| 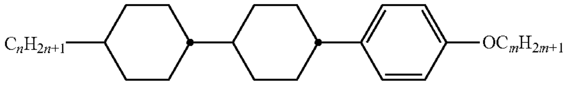 |
| CCP-n-Om |
| 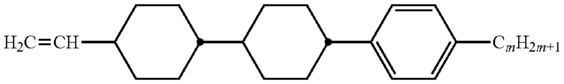 |
| CCP-V-m |
| 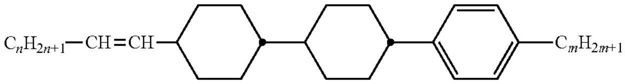 |
| CCP-nV-m |
| 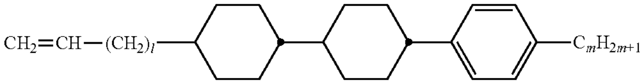 |
| CCP-VI-m |

TABLE D-continued
Exemplary, preferred compounds of formula IA
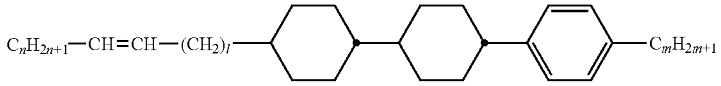
CCP-nVI-m
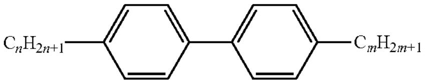
PP-n-m
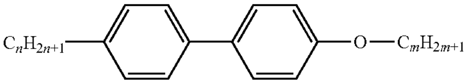
PP-n-Om
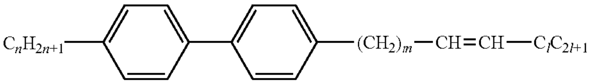
PP-n-mVI
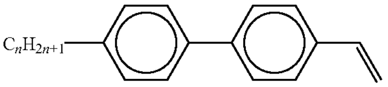
PP-n-V
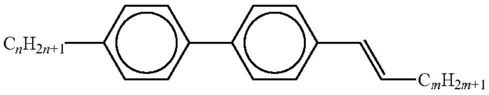
PP-n-Vm
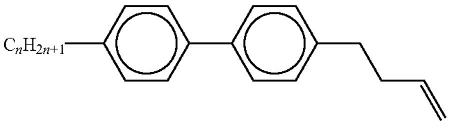
PP-n-2V
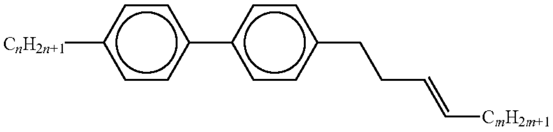
PP-n-2Vm
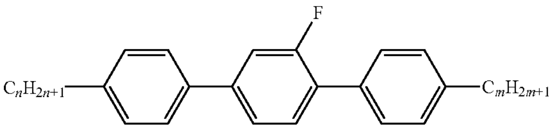
PGP-n-m
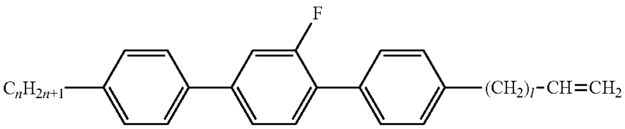
PGP-n-IV TABLE D-continued

| Exemplary, preferred compounds of formula IA |
|---|
| 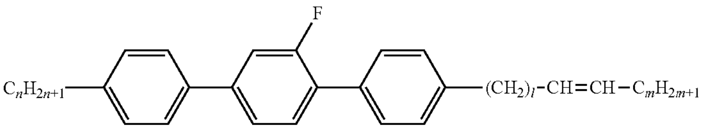 |
| PGP-n-IVm |

Exemplary, preferred compounds of formula IC

Mixture Examples

In the following exemplary mixtures are disclosed.

Mixture Example 1

The following mixture (M-1) is prepared and investigated.

| Mixture M-1 | | | |
|---|---|---|---|
| Composition | | | |
| Compound | | Concentration/ | |
| No. | Abbreviation | % by weight | Physical properties |
| 1 | DUUQU-2-F | 20.0 | T(N, I) = 85° C. |
| 2 | DUUQU-4-F | 30.0 | Δε(40° C., 1 kHz) = 314 |
| 3 | DUUQU-5-F | 30.0 | $ε_{\|\|}^{c}$(25° C., 1 kHz) = 1,763 |
| 4 | DUUQU-6-F | 20.0 | $ε⊥^{c}$(25° C., 1 kHz) = 1,543 |
| Σ | | 100.0 | $ε_{\|\|}^{c}$(40° C., 1 kHz) = 1,723 |
| | | | $ε⊥^{c}$(40° C., 1 kHz) = 1,399 |
| | | | $ε_{\|\|}^{h}$(40° C., 1 kHz) = 1,927 |
| | | | $ε⊥^{h}$(40° C., 1 kHz) = 1,410 |

Remarks:
[c]value upon cooling,
[h]value upon heating.

This mixture M-1 on cooling down shows a ferroelectric nematic phase from 40° C. down to 5° C. This phase is monotropic, i.e. super-coolable. Upon heating the phase re-occurs at about 35° C. and changes into a different, intermediate, phase at about 45° C. again. The phases are confirmed by microscopic inspection and by DSC. This mixture shows very high dielectric permittivities at these temperatures.

At higher temperatures a hysteresis for the dielectric constants is observed. At a temperature of about 60° C. the conventional nematic phase occurs.

Mixture Example 2

The following mixture (M-2) is prepared and investigated.

| Mixture M-2 | | | |
|---|---|---|---|
| Composition | | | |
| Compound | | Concentration/ | |
| No. | Abbreviation | % by weight | Physical properties |
| 1 | DUUQU-6-N | 75.0 | T(N, I) = 139° C. |
| 2 | DUUQU-7-N | 25.0 | |
| Σ | | 100.0 | |

This mixture M-2 shows a ferroelectric nematic phase. This ferroelectric nematic extends upon cooling from 30° C. to 25° C. upon cooling down.

Mixture Example 3

The following mixture (M-3) is prepared and investigated.

| Mixture M-3 | | | |
|---|---|---|---|
| Composition | | | |
| Compound | | Concentration/ | |
| No. | Abbreviation | % by weight | Physical properties |
| 1 | AUUQU-2-N | 75.0 | T(N, I) = 131° C. |
| 2 | AUUQU-5-N | 25.0 | |
| Σ | | 100.0 | |

This mixture M-3 shows a ferroelectric nematic phase. This phase extends from 46° C. to 25° C. upon cooling down.

Mixture Example 4

The following mixture (M-4) is prepared and investigated.

| Mixture M-4 | | | |
|---|---|---|---|
| Composition | | | |
| Compound | | Concentration/ | |
| No. | Abbreviation | % by weight | Physical properties |
| 1 | UUZU-4-N | 50.0 | T(N, I) = 94° C. |
| 2 | UUZU-5-N | 50.0 | |
| Σ | | 100.0 | |

This mixture M-4 shows a ferroelectric nematic phase. This phase extends from 77° C. to 31° C. upon cooling down.

Mixture Example 5

The following mixture (M-5) is prepared and investigated.

| Mixture M-5 Composition | | | |
|---|---|---|---|
| Compound | | Concentration/ | |
| No. | Abbreviation | % by weight | Physical properties |
| 1 | DUUQU-2-F | 15.0 | T(N, I) = 96° C. |
| 2 | DUUQU-4-F | 25.0 | $\varepsilon_r$ (20° C., 10 Hz) = 41900 |
| 3 | DUUQU-5-F | 30.0 | $\varepsilon_r$ (20° C., 1 kHz) = 5100 |
| 4 | DUUQU-6-F | 15.0 | |
| 5 | DUUQU-3-N | 5.0 | |
| 6 | DUUQU-4-N | 10.0 | |
| Σ | | 100.0 | |

This mixture M-5 shows a ferroelectric nematic phase below 62° C. It is metastable at 20° C. on cooling down.

Mixture Example 6

The following mixture (M-6) is prepared and investigated.

| Mixture M-6 Composition | | | |
|---|---|---|---|
| Compound | | Concentration/ | |
| No. | Abbreviation | % by weight | Physical properties |
| 1 | DUUQU-2-F | 6.0 | T(N, I) = 107° C. |
| 2 | DUUQU-4-F | 20.0 | |
| 3 | DUUQU-5-F | 20.0 | |
| 4 | DUUQU-6-F | 12.0 | |
| 5 | AUUQU-2-N | 12.0 | |
| 6 | AUUQU-3-N | 15.0 | |
| 7 | AUUQU-4-N | 15.0 | |
| Σ | | 100.0 | |

This mixture M-6 shows a ferroelectric nematic phase below 49° C.

Mixture Example 7

The following mixture (M-7) is prepared and investigated.

| Mixture M-7 Composition | | | |
|---|---|---|---|
| Compound | | Concentration/ | |
| No. | Abbreviation | % by weight | Physical properties |
| 1 | DUUQU-2-F | 9.0 | T(N, I) = 122° C. |
| 2 | DUUQU-4-F | 10.0 | |
| 3 | DUUQU-5-F | 16.0 | |
| 4 | DUUQU-3-N | 10.0 | |
| 5 | DUUQU-4-N | 12.0 | |
| 6 | AUUQU-2-N | 10.0 | |
| 7 | AUUQU-3-N | 16.0 | |
| 8 | AUUQU-4-N | 17.0 | |
| Σ | | 100.0 | |

This mixture M-7 shows a ferroelectric nematic phase. It is metastable at 20° C. on cooling down.

Mixture Example 8

The following mixture (M-8) is prepared and investigated.

| Mixture M-8 Composition | | | |
|---|---|---|---|
| Compound | | Concentration/ | |
| No. | Abbreviation | % by weight | Physical properties |
| 1 | DUUQU-4-N | 5.0 | T(N, I) = 88° C. |
| 2 | AUUQU-2-N | 6.0 | |
| 3 | AUUQU-3-N | 3.0 | |
| 4 | GUUQU-3-N | 4.0 | |
| 5 | GUUQU-4-N | 11.0 | |
| 6 | GUUQU-5-N | 3.0 | |
| 7 | GUZU-4-N | 11.0 | |
| 8 | GUZU-5-N | 6.0 | |
| 9 | GUQU-4-N | 10.0 | |
| 10 | UUZU-4-N | 12.0 | |
| 11 | UUZU-5-N | 10.0 | |
| 12 | UUQU-2-N | 6.0 | |
| 13 | UUQU-3-N | 6.0 | |
| 14 | UUQU-4-N | 7.0 | |
| Σ | | 100.0 | |

This mixture M-8 shows a stable ferroelectric nematic phase below 48° C.

Mixture Example 9

The following mixture (M-9) is prepared and investigated.

| Mixture M-8 Composition | | | |
|---|---|---|---|
| Compound | | Concentration/ | |
| No. | Abbreviation | % by weight | Physical properties |
| 1 | DUUQU-2-F | 5.0 | T(N, I) = 99° C. |
| 2 | DUUQU-4-F | 8.0 | |
| 3 | DUUQU-5-F | 12.0 | |
| 4 | AUUQU-2-N | 10.0 | |
| 5 | AUUQU-3-N | 13.0 | |
| 6 | AUUQU-4-N | 17.0 | |
| 7 | UUZU-4-N | 12.0 | |
| 8 | UUZU-5-N | 15.0 | |
| 9 | MUZU-5-N | 8.0 | |
| Σ | | 100.0 | |

This mixture M-9 shows a ferroelectric nematic phase at ambient temperature.

Mixture Example 10

The following mixture (M-10) is prepared and investigated.

| Mixture M-9 Composition | | | |
|---|---|---|---|
| Compound | | Concentration/ | |
| No. | Abbreviation | % by weight | Physical properties |
| 1 | DUUQU-2-F | 15.0 | T(N, I) = 99° C. |
| 2 | DUUQU-4-F | 25.0 | |
| 3 | DUUQU-5-F | 25.0 | |
| 4 | DUUQU-6-F | 15.0 | |
| 5 | GUQGU-3-N | 12.0 | |
| 6 | GUUQU-3-N | 8.0 | |
| Σ | | 100.0 | |

This mixture M-10 show a ferroelectric nematic phase below 59° C.

Mixture Example 11

The following mixture (M-11) is prepared and investigated.

| Mixture M-10 Composition | | | |
|---|---|---|---|
| Compound | | Concentration/ | |
| No. | Abbreviation | % by weight | Physical properties |
| 1 | DUUQU-2-F | 19.0 | T(N, I) = 82.5° C. |
| 2 | DUUQU-4-F | 28.0 | |
| 3 | DUUQU-5-F | 30.0 | |
| 4 | DUUQU-6-F | 20.0 | |
| 5 | CC-3-V | 3.0 | |
| Σ | | 100.0 | |

This mixture M-11 shows a ferroelectric nematic phase. This extends at least from 19° C. to 36° C.

Mixture Example 12

The following mixture (M-11) is prepared and investigated.

| Mixture M-12 Composition | | | |
|---|---|---|---|
| Compound | | Concentration/ | |
| No. | Abbreviation | % by weight | Physical properties |
| 1 | AUUQU-2-F | 20.0 | T(N, I) = 82.5° C. |
| 2 | DUZGU-3-F | 80.0 | |
| Σ | | 100.0 | |

This mixture M-12 shows a ferroelectric nematic phase. This extends at least from 60° C. to 73° C. upon heating and from 73° C. to 10° C. upon cooling.

The invention claimed is:

1. A liquid crystalline medium exhibiting a ferroelectric nematic phase at 20° C., and comprising 50% to 100% by weight in total of one or more compounds of formulae IA, IB and/or IC

IA

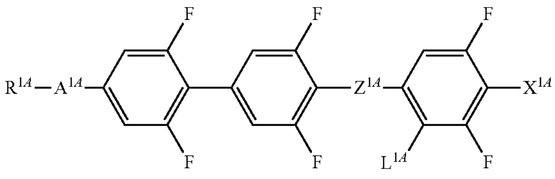

IB

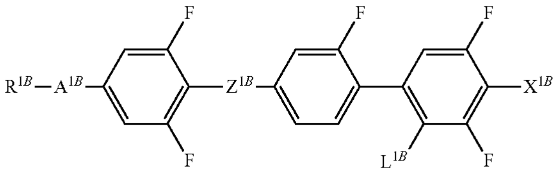

IC

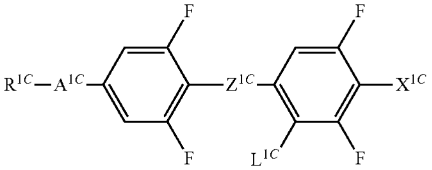

in which $X^{1A}$, $X^{1B}$ and $X^{1C}$ independently of each other denote —F, —$OCF_3$, —Cl, —NCS, or —CN, $Z^{1A}$, $Z^{1B}$ and $Z^{1C}$ independently of each other denote —(C═O)—O— or —$CF_2$—O—, $L^{1A}$, $L^{1B}$ and $L^{1C}$ independently of each other denote H or $CH_3$, $A^{1A}$ denotes

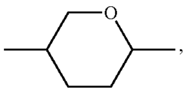,
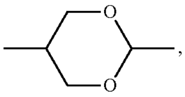,
or
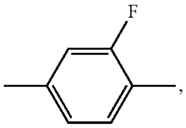, $A^{1B}$ denotes

or
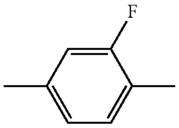

$A^{1C}$ denotes

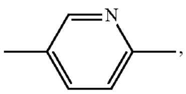,
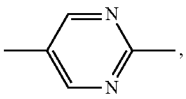,

-continued

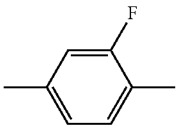

or

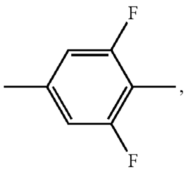

$R^{1A}$, $R^{1B}$ and $R^{1C}$ independently of one another denote an alkyl radical having 1 to 15 C atoms, in which one or more $CH_2$ groups may in each case be replaced, independently of one another, by —C≡C—, —$CF_2O$—, —$OCF_2$—, —CH═CH—,

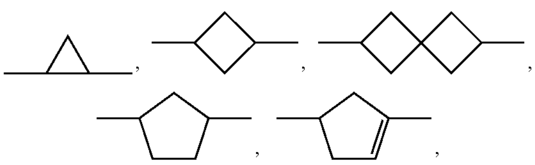

—O—, —S—, —CO—O— or —O—CO— in such a way that O/S atoms are not linked directly to one another, and in which one or more H atoms may be replaced by halogen, or denotes H.

2. A liquid crystalline medium comprising at least 25% by weight of one or more compounds of formula IA, and one or more compounds of formulae IB and/or IC,

IA

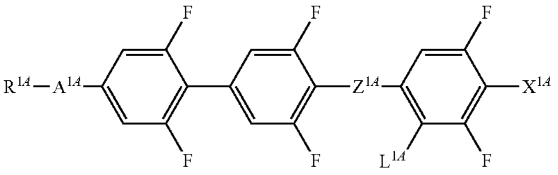

IB

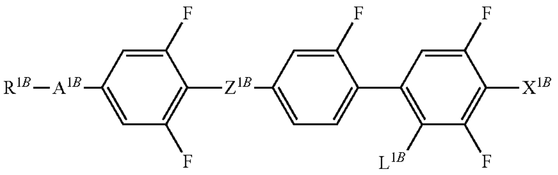

IC

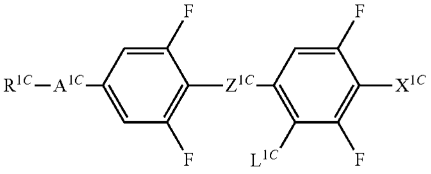

in which $X^{1A}$, $X^{1B}$ and $X^{1C}$ denote —CN, $Z^{1A}$, $Z^{1B}$ and $Z^{1C}$ independently of each other denote —(C═O)—O— or —$CF_2$—O—, $L^{1A}$, $L^{1B}$ and $L^{1C}$ independently of each other denote H or $CH_3$, $A^{1A}$ denotes

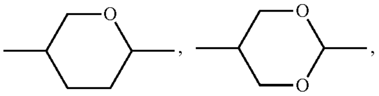

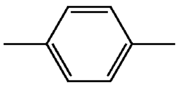

or

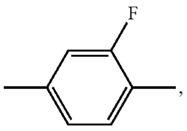

$A^{1B}$ denotes

or

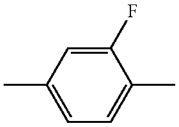

$A^{1C}$ denotes

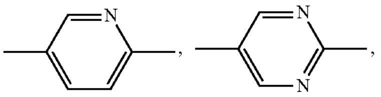

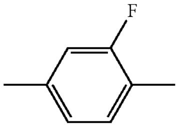

or

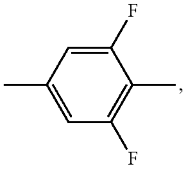

$R^{1A}$, $R^{1B}$ and $R^{1C}$ independently of one another denote an alkyl radical having 1 to 15 C atoms, in which one or more $CH_2$ groups may in each case be replaced, independently of one another, by —C≡C—, —$CF_2O$—, —$OCF_2$—, —CH═CH—,

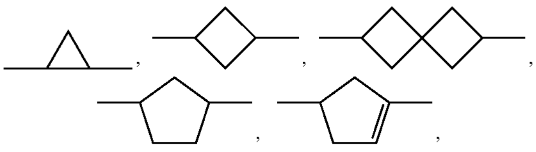

—O—, —S—, —CO—O— or —O—CO— in such a way that O/S atoms are not linked directly to one another, and in which one or more H atoms may be replaced by halogen, or denotes H.

3. The medium according to claim 2 exhibiting a ferroelectric nematic phase.

4. The medium according to claim 1, comprising one or more compounds of formula IA.

5. The medium according to claim 2, comprising one or more compounds of formula IB.

6. The medium according to claim 2, comprising one or more compounds of formula IC.

7. The medium according to claim 2, comprising one or more compounds of formula IB and one or more compounds of formula IC.

8. A liquid crystalline medium exhibiting a ferroelectric nematic phase over a temperature range that encompasses 0°

C. to 40° C., and comprising 50% to 100% by weight in total of one or more compounds of formulae IA, IB and/or IC

IA

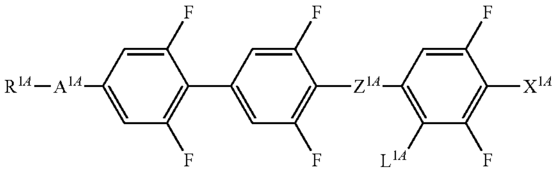

IB

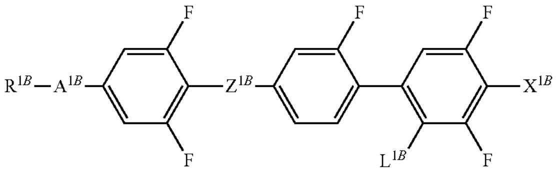

IC

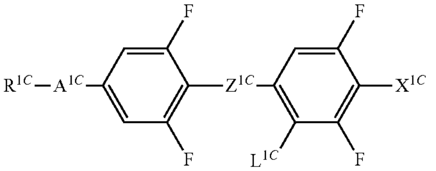

in which $X^{1A}$, $X^{1B}$ and $X^{1C}$ independently of each other denote —F, —$OCF_3$, —Cl, —NCS, or —CN, $Z^{1A}$, $Z^{1B}$ and $Z^{1C}$ independently of each other denote —(C═O)—O— or —$CF_2$—O—, $L^{1A}$, $L^{1B}$ and $L^{1C}$ independently of each other denote H or $CH_3$, $A^{1A}$ denotes

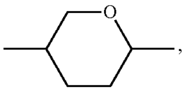
,
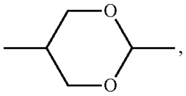
,
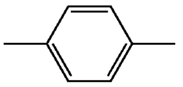
or
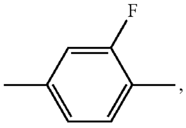
, $A^{1B}$ denotes

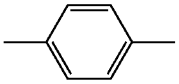
or
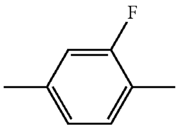

$A^{1C}$ denotes

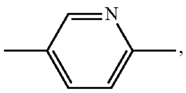
,
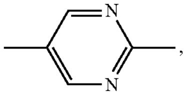
,
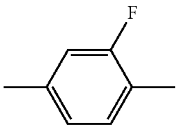
or
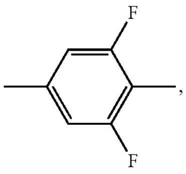
, $R^{1A}$, $R^{1B}$ and $R^{1C}$ independently of one another denote an alkyl radical having 1 to 15 C atoms, in which one or more $CH_2$ groups may in each case be replaced, independently of one another, by —C≡C—, —$CF_2O$—, —$OCF_2$—, —CH═CH—,

,
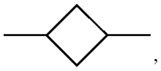
,
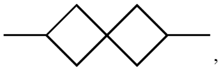
,
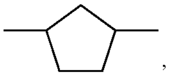
,
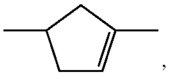
,

—O—, —S—, —CO—O— or —O—CO— in such a way that O/S atoms are not linked directly to one another, and in which one or more H atoms may be replaced by halogen, or denotes H.

9. The medium according to claim 1 exhibiting a dielectric anisotropy at 20° C. and 1 kHz of 400 or more.

10. The medium according to claim 1 exhibiting a hysteresis in its dielectric properties.

11. An energy-saving display or electric appliance comprising the liquid crystalline medium according to claim 1.

12. An electro-optical liquid-crystal display comprising a liquid crystalline medium according to claim 1.

13. A method of preparation of the liquid crystalline medium according to claim 1, comprising mixing together one or more compounds of formulae IA, IB and IC.

14. A method of operation of an electro-optical device, comprising operating said device in bistable mode, which contains the liquid crystalline material according to claim 1, and which shows a hysteresis in its dielectric properties.

15. The medium according to claim 2, which comprises one or more compounds of formula IC in an amount of at least 35%.

16. The medium according to claim 1 exhibiting a ferroelectric nematic phase over a temperature range of 0° C. to 40° C.

17. A method of preparation of the liquid crystalline medium according to claim 2, comprising mixing together one or more compounds formulae IA, with one or more compounds of formula IB and/or IC.

18. The method according to claim 14, wherein the electro-optical device is a liquid-crystal display.

* * * * *